United States Patent
Kim et al.

(10) Patent No.: US 11,372,782 B2
(45) Date of Patent: Jun. 28, 2022

(54) COMPUTING SYSTEM FOR REDUCING LATENCY BETWEEN SERIALLY CONNECTED ELECTRONIC DEVICES

(71) Applicant: SAMSUNG ELECTRONICS CO., LTD., Suwon-si (KR)

(72) Inventors: Dong-Uk Kim, Seoul (KR); Yohan Ko, Seoul (KR); Insoon Jo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 16/811,117

(22) Filed: Mar. 6, 2020

(65) Prior Publication Data
US 2021/0049114 A1  Feb. 18, 2021

(30) Foreign Application Priority Data
Aug. 14, 2019 (KR) .................. 10-2019-0099851

(51) Int. Cl.
| | |
|---|---|
| G06F 13/16 | (2006.01) |
| G06F 9/54 | (2006.01) |
| G06F 13/42 | (2006.01) |
| G06F 13/40 | (2006.01) |

(52) U.S. Cl.
CPC .......... *G06F 13/1621* (2013.01); *G06F 9/544* (2013.01); *G06F 9/546* (2013.01); *G06F 13/1673* (2013.01); *G06F 13/404* (2013.01); *G06F 13/4221* (2013.01)

(58) Field of Classification Search
None
See application file for complete search history.

(56) References Cited

U.S. PATENT DOCUMENTS

| | | | |
|---|---|---|---|
| 9,304,690 B2 | 4/2016 | McCambridge et al. | |
| 9,400,614 B2 | 7/2016 | Hoglund et al. | |
| 9,424,224 B2 | 8/2016 | Voorhees et al. | |
| 9,557,922 B2 | 1/2017 | McCambridge et al. | |
| 10,423,568 B2* | 9/2019 | Berman | G06F 3/0656 |
| 2014/0337540 A1* | 11/2014 | Johnson | G06F 13/14 710/5 |
| 2017/0357609 A1* | 12/2017 | Long | G06F 13/4022 |
| 2018/0018101 A1* | 1/2018 | Benisty | G06F 3/0608 |
| 2018/0107614 A1* | 4/2018 | Hong | G06F 9/3814 |
| 2019/0042491 A1 | 2/2019 | Shekhar | |
| 2019/0065417 A1 | 2/2019 | Yamashita et al. | |
| 2019/0187928 A1* | 6/2019 | Agarwal | G06F 12/0246 |

FOREIGN PATENT DOCUMENTS

JP  2009-205334 A  9/2009

OTHER PUBLICATIONS

NVM Express, Inc., "NVM Express Base Specification", Revision 1.3d, Mar. 20, 2019. (298 pages total).

* cited by examiner

*Primary Examiner* — Elias Mamo
(74) *Attorney, Agent, or Firm* — Sughrue Mion, PLLC

(57) ABSTRACT

A computing system includes a host, a first electronic device connected to the host, and a second electronic device that communicates with the host through the first electronic device. The first electronic device requests a command written in a submission queue of the host based on a doorbell transmitted from the host, stores the command transmitted from the host, requests write data stored in a data buffer of the host, and stores the write data of the data buffer transmitted from the host.

9 Claims, 20 Drawing Sheets

COMPUTING SYSTEM FOR REDUCING LATENCY BETWEEN SERIALLY CONNECTED ELECTRONIC DEVICES

CROSS-REFERENCE TO RELATED APPLICATIONS

This application claims priority under 35 U.S.C. § 119 to Korean Patent Application No. 10-2019-0099851 filed on Aug. 14, 2019, in the Korean Intellectual Property Office, the disclosure of which is herein incorporated by reference in its entirety.

BACKGROUND

1. Field

Embodiments of the inventive concept described herein relate to a computing system, and more particularly, a computing system for decreasing a latency between serially connected electronic devices.

2. Description of Related Art

In a computing system, a plurality of electronic devices may be connected for communication with each other. The plurality of electronic devices may be connected serially or sequentially. The serially connected electronic devices may communicate with a host of the computing system.

An electronic device corresponding to an endpoint device or a terminating device from among the plurality of electronic devices may communicate with the host through at least one or more serially connected electronic devices. A communication speed between the endpoint device and the host may become slow due to a latency of the intervening at least one or more electronic devices interposed between the endpoint device and the host. In particular, in the configuration that the endpoint device is a high-speed electronic device, the communication speed between the high-speed electronic device and the host via the intervening electronic devices may decrease significantly.

SUMMARY

Embodiments of the inventive concept provide a computing system for reducing a latency between electronic devices connected in series.

According to an embodiment, there is provided a computing system including a host, a first electronic device coupled the host, and a second electronic device coupled to the first electronic device, the second electronic device configured to communicate with the host through the first electronic device. The first electronic device is configured to request the host to transmit a write command written in a submission queue of the host based on a doorbell received from the host, store the write command received from the host, request the host to transmit write data of the write command stored in a data buffer of the host, and store the write data received from the host.

According to an embodiment, there is provided a computing system includes a host, a first electronic device coupled to the host, and a second electronic device coupled to the first electronic device, the second electronic device configured to communicate with the host through the first electronic device. The first electronic device is configured to receive a write command for the second electronic device from the host and transmit the write command to the second electronic device, receive a doorbell associated with a submission queue, in which the write command is written, from the host, transmit the doorbell to the second electronic device, request write data of the write command stored in a data buffer of the host, and store the write data received from the host.

According to an embodiment, there is provided a computing system including a host, a first electronic device coupled to the host that includes a submission queue controller memory buffer (CMB) and a write CMB, and a second electronic device coupled to the first electronic device, the second electronic device configured to communicate with the host through the first electronic device. The first electronic device is configured to receive, from the host, a write command written in a submission queue of the host and store the write command in the submission queue CMB, receive, from the host, write data of the write command stored in a data buffer of the host, store the write data in the write CMB, receive a doorbell transmitted from the host with regard to the submission queue and transmit the doorbell to the second electronic device.

BRIEF DESCRIPTION OF THE FIGURES

The above and other objects and features of the inventive concept will become apparent by describing in detail embodiments thereof with reference to the accompanying drawings.

DETAILED DESCRIPTION

Figure 1:
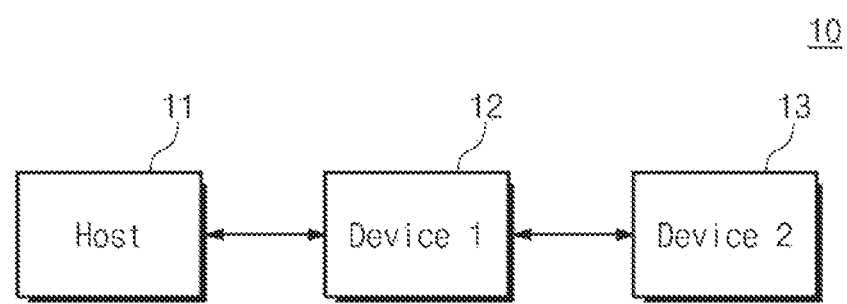
FIG. 1 illustrates a block diagram of a computing system according to an embodiment.

FIG. 1 illustrates a block diagram of a computing system according to an embodiment.

As illustrated in FIG. 1, a computing system 10 may include a host 11, a first electronic device 12, and a second electronic device 13. The host 11, the first electronic device 11, and the second electronic device 12 of the computing system 10 may be any of various electronic devices, such as a desktop computer, a laptop computer, a tablet computer, a video game console, a workstation, a server, a computing device, and an electric vehicle, or on a main board of an electronic device.

The host 11 may be implemented with a system on chip (SoC), an application specific integrated circuit (ASIC), or a field programmable gate array (FPGA). The control circuitry of the host 11 may also include a general-purpose processor, central processing unit, a special-purpose processor, or an application processor. The host 11 may be implemented as a processor itself, or the host 11 may be an electronic device or a system including a processor. The host 11 may control overall communications of the computing system 10 including communications between the host 11, the first electronic device 12, and the second electronic device 13.

The first electronic device 12 may be connected to the host 11 directly or serially (or sequentially). The second electronic device 13 may be connected to the first electronic device 12 directly or serially. Thus, the host 11, the first electronic device 12, and the second electronic device 13 may be connected in a sequential manner. In other words, the second electronic device 13 may be connected to the host 11 through the first electronic device 12. For example, the host 11 may directly communicate with the first electronic device 12 and may communicate with the second electronic device 13 through the first electronic device 12. Accordingly, the second electronic device 13 may correspond to an endpoint device, and the first electronic device 12 may be an intermediate device connecting the endpoint electronic device 13 to the host 11.

Unlike the example illustrated in FIG. 1, additional electronic devices may be further connected in the computing system 10 anywhere between the host 11 and the first electronic device 12, and between the first electronic device 12 and the second electronic device 13. Of course, an additional electronic device may be connected to only the second electronic device 13, such that the additional electronic device may be the endpoint device of the computing system 10.

The first electronic device 12 and the second electronic device 13 may be implemented to be identical electronic devices or different electronic devices. For another example, the first electronic device 12 may correspond to a switch or a switch device connecting the second electronic device 13 to the host 11, and the second electronic device 13 may correspond to an endpoint device, which is different from the switch device.

Figure 2:
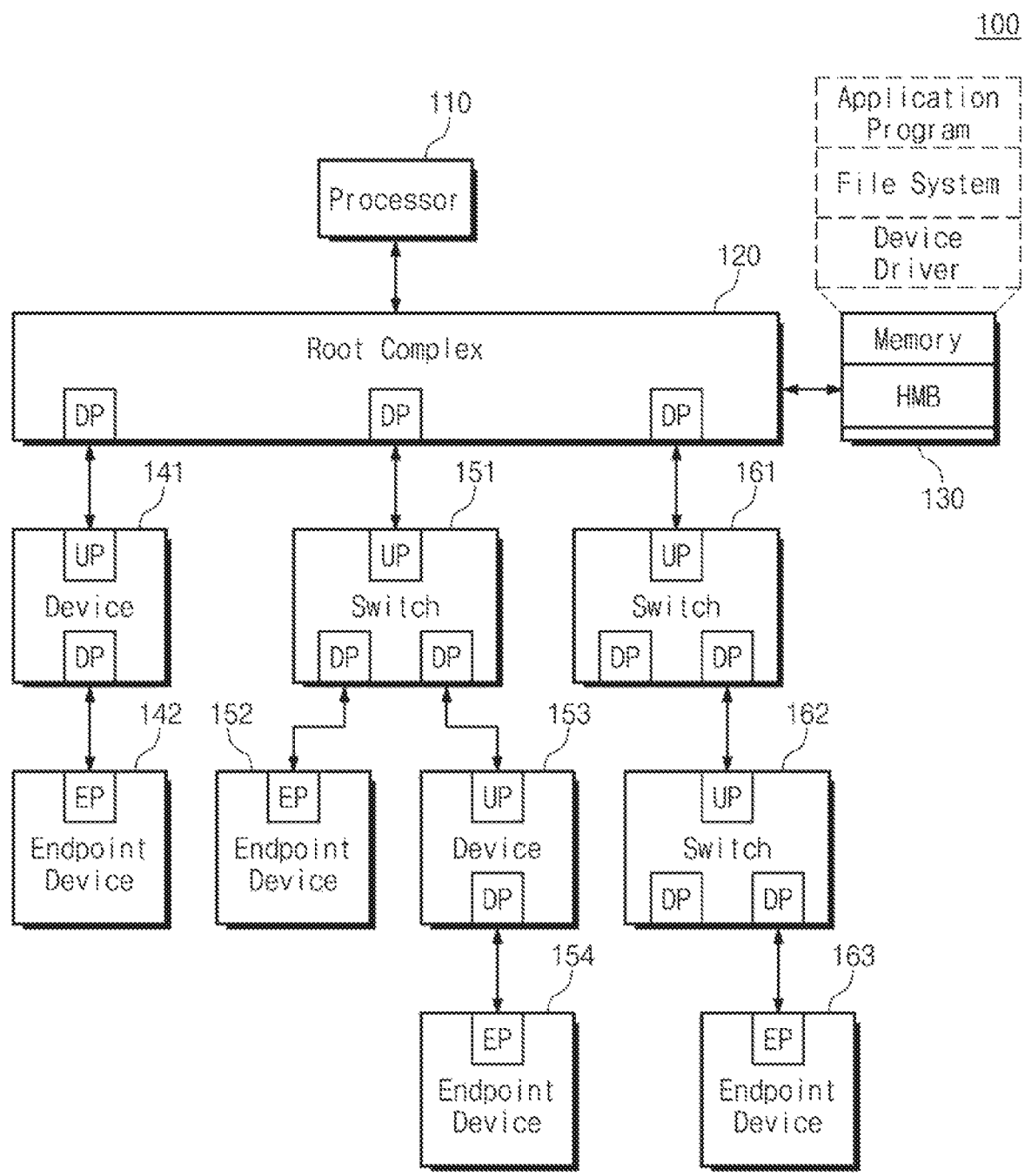
FIG. 2 illustrates a detailed block diagram of the computing system of FIG. 1.

FIG. 2 illustrates a detailed block diagram of the computing system of FIG. 1. A computing system 100, which may correspond to the computing system 10 of FIG. 1, may include a processor 110, a root complex 120, a memory 130, and electronic devices 141, 142, 151 to 154, and 161 to 163. Here, an electronic device may be also referred to as an "input/output (I/O) device" and the electronic devices 141, 142, 151 to 154, and 161 to 163 may correspond to the first electronic device 12 and the second electronic device 13 illustrated in FIG. 1. The processor 110, the root complex 120, and the memory 130 may be components of the host 11 illustrated in FIG. 1.

The processor 110 may perform various kinds of arithmetic operations or logical operations. For example, the processor 110 may include at least one or more cores (e.g., a homogeneous multi-core or a heterogeneous multi-core) that control operations and an internal cache memory. The processor 110 may execute a program code, software, an application program, etc. loaded from the memory 130.

The root complex 120 may mediate communication between the processor 110, the memory 130, and the electronic devices 141, 142, 151 to 154, and 161 to 163. For example, the root complex 120 may manage a communication timing, a communication sequence, a communication environment, etc. between the processor 110, the memory 130, and the electronic devices 141, 142, 151 to 154, and 161 to 163. The root complex 120 may be implemented in a hardware configuration, a software configuration, or a combination of hardware and software and may be implemented on a main board of the computing system 100. The root complex 120 may be a root that communicatively connects the processor 110 and the memory 130 to an I/O hierarchy including the electronic devices 141, 142, 151 to 154, and 161 to 163. The root complex 120 may include one or more downstream ports DP. The electronic devices 141 and 142 may be connected to the downstream port DP of the root complex 120. The electronic devices 151 to 154 may be connected to the downstream port DP of the root complex 120. And, the electronic devices 161 to 163 may be connected to the downstream port DP of the root complex 120. The number of downstream ports DP is not limited to the configuration illustrated in FIG. 2. The number of electronic devices connected to each of the downstream ports DP may be one or more.

In an embodiment, the communication between the root complex 120 and the electronic devices 141, 142, 151 to 154, and 161 to 163 may be performed in compliance with various communication interface protocols such as a peripheral component interconnect express (PCIe) protocol, a mobile PCIe (M-PCIe) protocol, a nonvolatile memory express (NVMe) protocol, a universal serial bus (USB) protocol, a small computer system interface (SCSI) protocol, an advanced technology attachment (ATA) protocol, a parallel ATA (PATA), a serial ATA (SATA), a serial attached SCSI (SAS) protocol, an integrated drive electronics (IDE) protocol, a universal flash storage (UFS) protocol, and a Firewire protocol.

The memory 130 may store data that are used for an operation of the computing system 100. The memory 130 may store data processed or to be processed by the processor 110. For example, the memory 130 may include a volatile memory such as a static random access memory (SRAM) or a dynamic RAM (DRAM), or a nonvolatile memory. An application program, a file system, or a device driver that is executable by the processor 110 may be loaded onto the memory 130. A program and a software layer loaded onto the memory 130 may be executed under control of the processor 110, and the information loaded into the memory 130 is not limited to the example illustrated in FIG. 2. The memory 130 may include a host memory buffer (HMB). A portion of the whole storage area of the memory 130 may be assigned to the host memory buffer HMB.

The processor 110 may correspond to a processor of the host 11 of FIG. 1. The processor 110 and the root complex 120 may correspond to components of the host 11 of FIG. 1.

And, the processor 110, the root complex 120, and the memory 130 all may correspond to components of the host 11 of FIG. 1. The processor 110, the root complex 120, and the memory 130 may be implemented with as a system on chip (SoC) to constitute the host 11. Alternatively, the processor 110, the root complex 120, and the memory 130 may be implemented with one or more separate components to constitute the host 11.

Each of the electronic devices 142, 152, 154, and 163 may be configured as an endpoint device. Each of the electronic devices 142, 152, 154, and 163 may include an endpoint port EP. Each of the remaining electronic devices 141, 151 to 153, 161, and 162 may correspond to an intermediate device. The intermediate device may connect to an endpoint device, another intermediate device, or the root complex 120. Each of the electronic devices 141, 153, 161, and 162 may include an upstream port UP and a downstream port DP. For example, the upstream point UP of the electronic devices 141, 153, 161, and 162 may be disposed on an upstream side of the electronic devices 141, 153, 161, and 162 towards the root complex 120. The downstream port DP of the electronic devices 141, 153, 161, and 162 may be disposed on a downstream side of the electronic devices 141, 153, 161, and 162 towards the endpoint. The endpoint port EP of an endpoint device may be connected to a downstream port DP of an intermediate device or the root complex 120. The endpoint port EP may be also referred to as the "upstream point UP." In the configuration of FIG. 2, one of the electronic devices 141, 151 to 153, 161, and 162 may correspond to the first electronic device 12 of FIG. 1, and one of the electronic devices 142, 152, 154, and 163 may correspond to the second electronic device 13 of FIG. 1.

In an embodiment, the electronic devices 141, 151 to 153, 161, and 162 corresponding to the first electronic device 12 of FIG. 1 may be a PCIe switch, a PCIe device, an NVMe device, a storage device, or a solid state drive (SSD). The electronic devices 142, 152, 154, and 163 corresponding to the second electronic devices 13 of FIG. 1 may also be a PCIe switch, a PCIe device, an NVMe switch, an NVMe device, a storage device, or an SSD. As described above, any other endpoint devices connected to the electronic devices 142, 152, 154, and 163 may be further included in the computing system 100.

Figure 3:
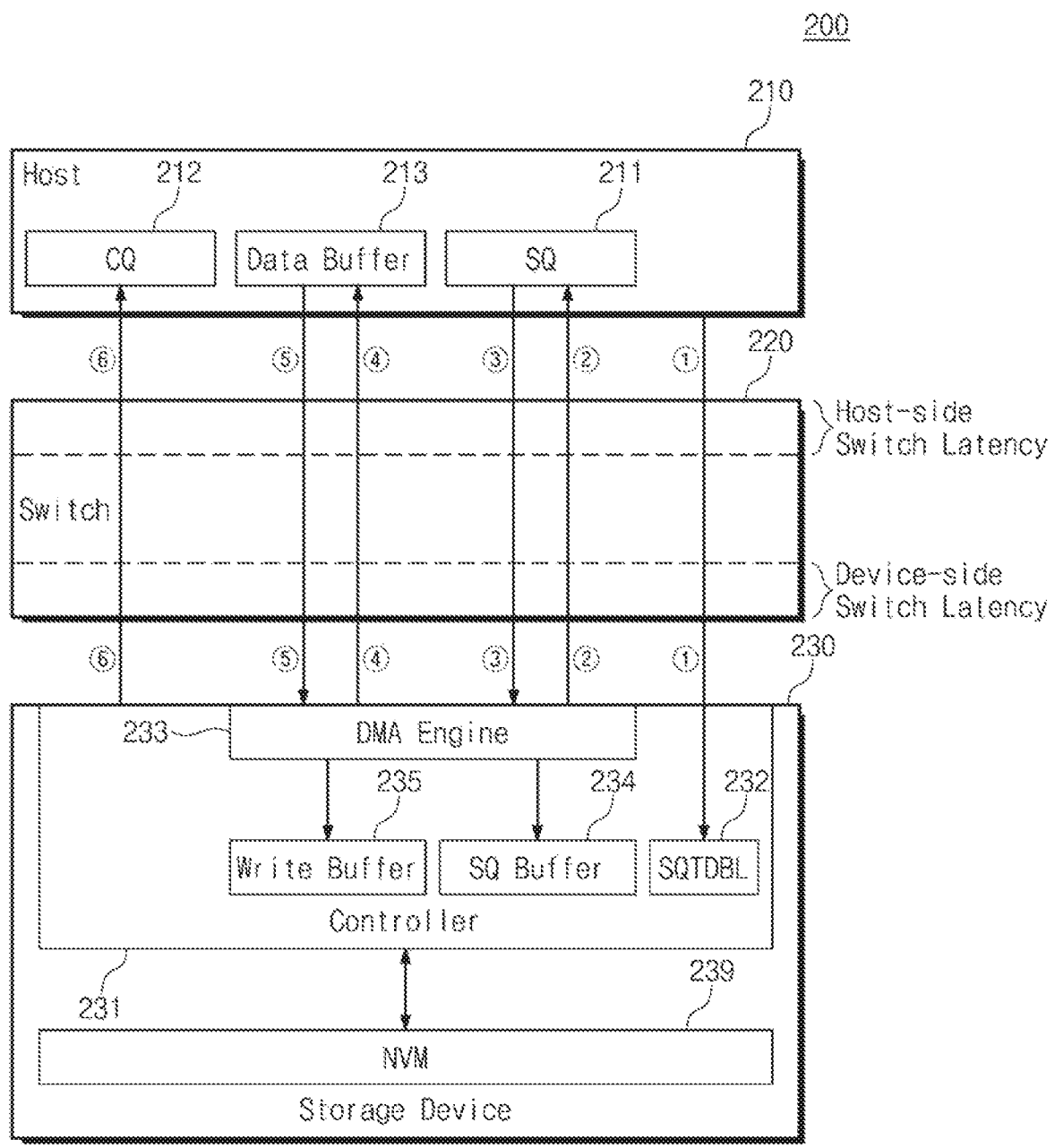
FIG. 3 illustrates a block diagram of the computing system of FIG. 1.
Figure 4:
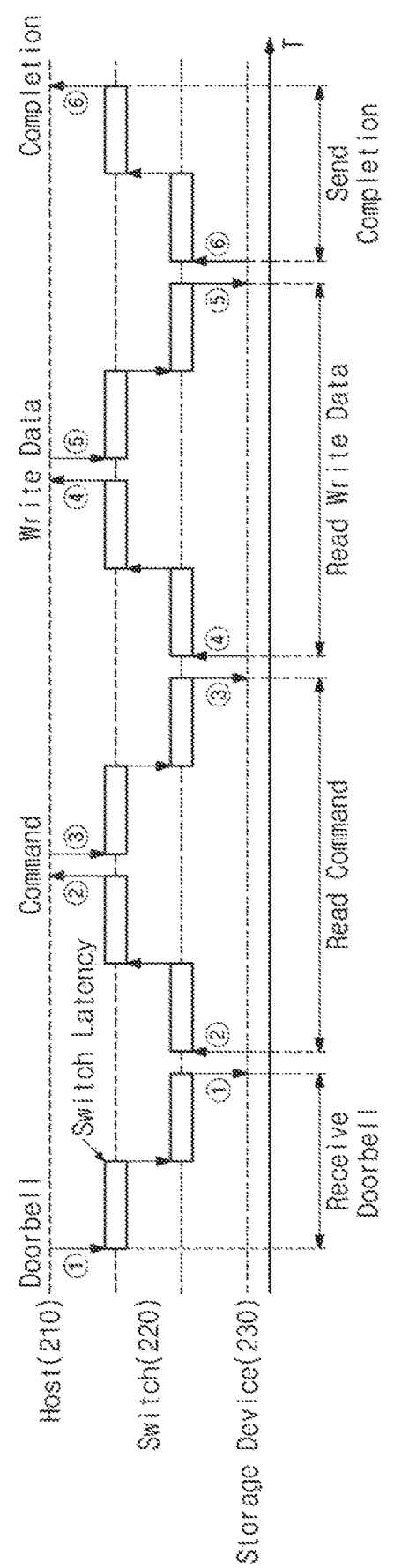
FIG. 4 illustrates a timing diagram of the computing system of FIG. 3.

FIG. 3 illustrates a block diagram of the computing system of FIG. 1. FIG. 4 illustrates a timing diagram of the computing system of FIG. 3.

As illustrated in FIG. 3, a computing system 200 may include a host 210, a switch 220, and a storage device 230. For example, the computing system 200, the host 210, the switch 220, and the storage device 230 may correspond to the computing system 100, the host 11, the first electronic device 12, and the second electronic device 13 of FIG. 1, respectively.

The host 210 may include a submission queue (SQ) 211, a completion queue (CQ) 212, and a data buffer 213. The submission queue 211, the completion queue 212, and the data buffer 213 may be implemented on the host memory buffer HMB of FIG. 2 and may occupy portions of the host memory buffer HMB. The host 210 may perform input/output (I/O) operations for the storage device 230 through the switch 220, based on the submission queue 211 and the completion queue 212.

The switch 220 may be disposed between the host 210 and the storage device 230 and may transmit electrical signals from the host 210 (or the storage device 230) to the storage device 230 (or the host 210). Thus, the switch 220 acts as an intermediate device between the host 210 and the storage device 230. The storage device 230 may receive commands of the host 210, may process the received commands, and may transmit the processed result to the host 210 via the switch 220. The storage device 230 may include a nonvolatile memory 239 and a controller 231 to control the nonvolatile memory 239. The nonvolatile memory 239 may include a NAND flash memory, a NOR flash memory, a phase change RAM (PRAM), a magnetic RAM (MRAM), a resistive RAM (RRAM), a ferroelectric RAM (FeRAM), etc.

The host 210 may input or write a command for the storage device 230 in an entry (or a slot) of the submission queue 211, and may update a tail pointer of the submission queue 211, that is, a doorbell for the submission queue 211. For example, the doorbell may include an address indicating the submission queue 211. The pair of the submission queue 211 and the completion queue 212 may be provided for each core of the processor 110, and the number of pairs may be one or more. With respect to FIGS. 3 and 4, the host 210 may submit or transmit a doorbell for the submission queue 211 to the storage device 230 through the switch 220 (①). When switch latencies of the switch 220 elapse after the doorbell is transmitted from the host 210 (①), the storage device 230 may receive the doorbell from the switch 220 (①). A latency may be referred to as a "time." For example, the whole (total) latency of the switch 220 may be divided into a host-side switch latency and a storage device-side switch latency. In detail, the switch 220 may include one or more transmission circuits for transmitting a doorbell and a transmission path including physical paths in the switch 220. For example, a time taken for the doorbell to pass through a portion of the transmission path of the switch 220 may correspond to the host-side switch latency, and a time taken for the doorbell to pass through the remaining portion of the transmission path of the switch 220 may correspond to the storage device-side switch latency.

The host 210 may update a doorbell register (SQTDBL) 232 of the controller 231 of the storage device 230 by transmitting the doorbell (①). The storage device 230 may read the doorbell stored in the doorbell register 232 and may identify (check) that a command is input or written in the submission queue 211 by the host 210. The storage device 230 may fetch or read the command of the submission queue 211 of the host 210 based on the doorbell (②, ③). For example, the storage device 230 may request the command of the submission queue 211 of the host 210 and may transmit the request to the host 210 through the switch 220 (②). Then, the storage device 230 may read or receive the command of the submission queue 211 through the switch 220 from the host 210 (③). When switch latencies elapse after the request for the command is transmitted from the storage device 230 to the switch 220 (②), the request may arrive at the host 210 (②). Also, when switch latencies elapse after the command is transmitted from the host 210 to the switch 220 (③), the command of the submission queue 211 may arrive at the storage device 230 (③). As in the transmission of the doorbell, switch latencies may occur in the instances of transmitting a request for a command (②) and transmitting a command (③), respectively.

The controller 231 of the storage device 230 may include a direct memory access (DMA) engine 233 configured to directly transmit a request or data to the switch 220 or the host 210. The DMA engine 233 may receive a command from the switch 220 and may store the received command in a submission queue buffer 234 of the controller 231.

The storage device 230 may process the command stored in the submission queue buffer 234. For example, the command may be a write command. The storage device 230 may decode the command and may read write data stored in the data buffer 213 of the host 210 based on the command (④, ⑤). For example, the storage device 230 may request the write data of the data buffer 213 of the host 210 and may transmit the request to the host 210 through the switch 220 (④). Then, the storage device 230 may receive the write data of the data buffer 213 through the switch 220 from the host 210 (⑤). When switch latencies elapse after the request for the write data is transmitted from the storage device 230 to the switch 220 (④), the request may arrive at the host 210 (④). Also, when switch latencies elapse after the write data are transmitted from the data buffer 213 to the switch 220 (⑤), the write data may arrive at the storage device 230 (⑤). As in the transmission of the doorbell, switch latencies may occur in the instances of transmitting a request for write data (④) and transmitting the write data (⑤), respectively.

The DMA engine 233 may request write data, may receive the write data, and may store the received write data in a write buffer 235 of the controller 231. Though the operations above have been described in the context that write data are requested and transmitted under the assumption that a command is a write command, but the transmission of write data may not be performed when the command is not the write command (e.g., is a read command).

The storage device 230 may process a command of the host 210 and may transmit completion information about the command to the host 210 through the switch 220 (⑥). For example, the completion information may include whether a command is successfully or unsuccessfully completed, a result of processing the command, etc. When switch latencies elapse after the completion information is transmitted from the storage device 230 to the switch 220 (⑥), the completion information may arrive at the host 210 (⑥). The completion information may be stored or written in the completion queue 212 of the host 210. When switch latencies elapse after the completion information is transmitted from the storage device 230 to the switch 220 (⑥), the completion information may arrive at the host 210 (⑥). As in the transmission of the doorbell, switch latencies may occur even in the instance of transmitting completion information (⑥).

Embodiments described herein may provide a plurality of computing systems 300 to 700 and 1000 for reducing a time taken to process a command generated (or issued) from the host 210 or a time taken for a command or write data generated from the host 210 to arrive at an endpoint device (i.e., the storage device 230) in consideration of switch latencies due to the switch 220 between the host 210 and the storage device 230.

Figure 5:
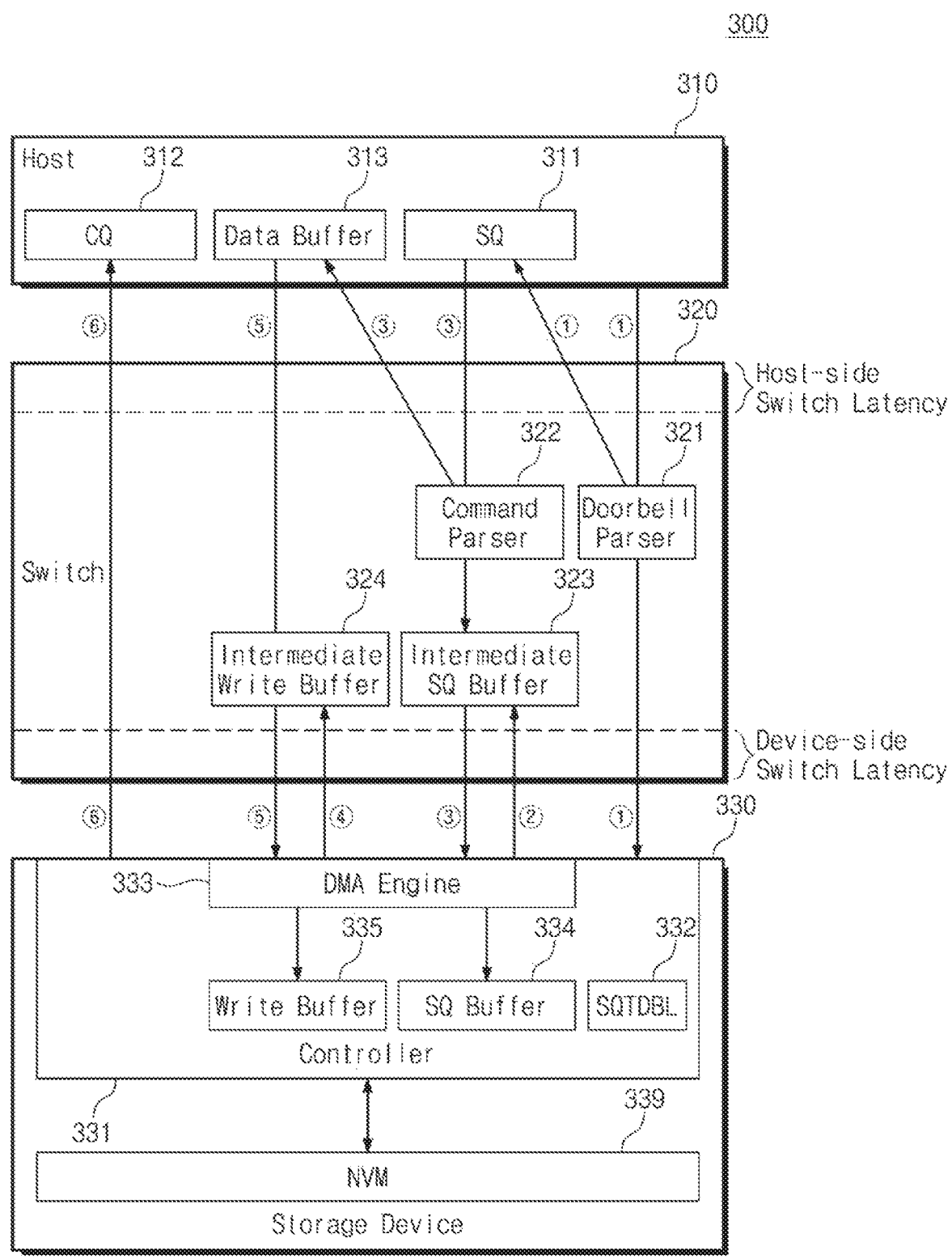
FIG. 5 illustrates a block diagram of the computing system of FIG. 1.
Figure 6:
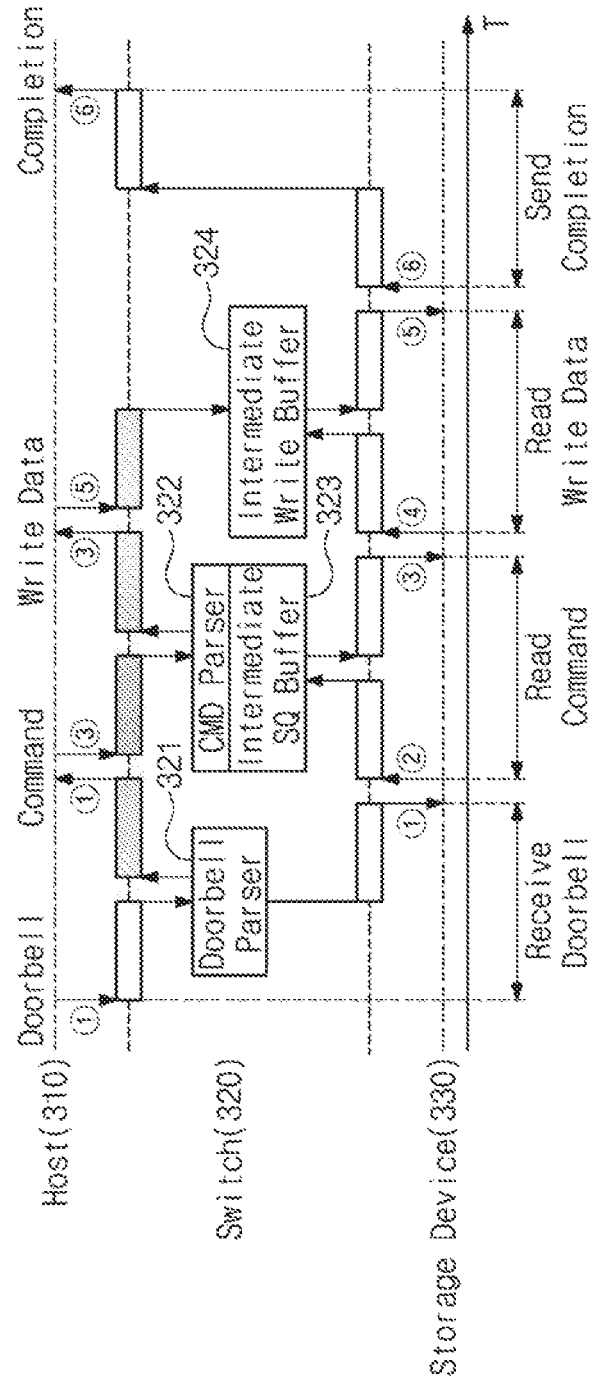
FIG. 6 illustrates a timing diagram of the computing system of FIG. 5.
Figure 7:
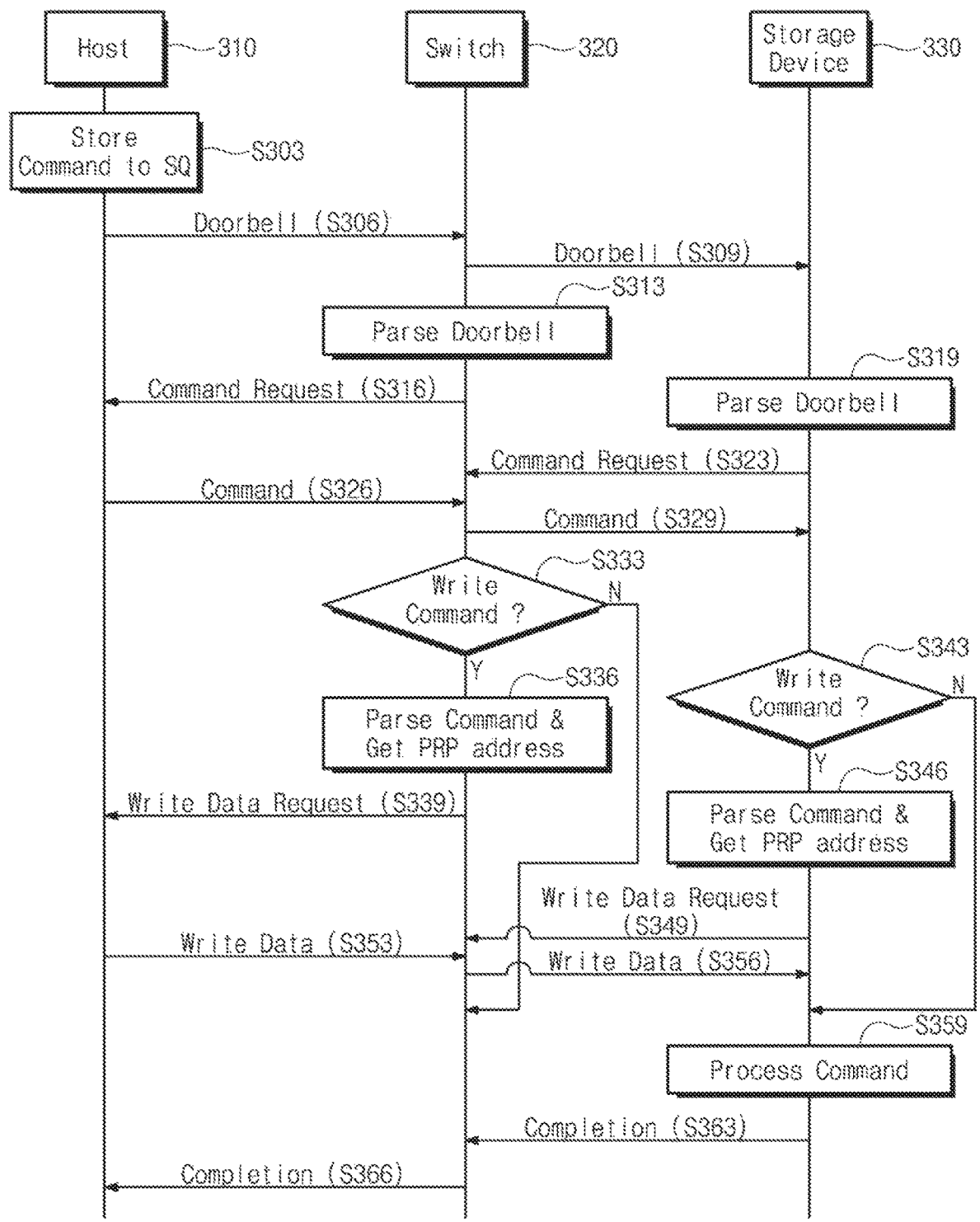
FIG. 7 illustrates a method of operating the computing system of FIG. 5.

FIG. 5 illustrates a block diagram of the computing system of FIG. FIG. 6 illustrates a timing diagram of the computing system of FIG. 5. FIG. 7 illustrates a method of operating the computing system of FIG. 5.

As shown in FIG. 5, a computing system 300 may include a host 310, a switch 320, and a storage device 330. The host 310 may include a submission queue 311, a completion queue 312, and a data buffer 313. The components 311 to 313 of the host 310 may be similar to the components 211 to 213 of the host 210, respectively. Compared with the switch 220 of FIG. 3, the switch 320 of FIG. 5 may include a doorbell parser 321, a command parser 322, an intermediate submission queue buffer 323, and an intermediate write buffer 324. The storage device 330 may include a controller 331 and a nonvolatile memory 339. The controller 331 may include a doorbell register 332, a DMA engine 333, a submission queue buffer 334, and a write buffer 335. The components 331 to 335 and 339 of the storage device 330 of FIG. 5 may be similar to the components 231 to 235 and 239 of the storage device 230 of FIG. 3, respectively. Redundant descriptions of components described above will be omitted and the following description will be focused on a difference between the computing system 300 of FIG. 5 and the computing system 200 of FIG. 3.

Referring to FIG. 5, FIG. 6, and FIG. 7 in conjunction, in operation S303, the host 310 may write or store a command for the storage device 330 in the submission queue 311. In operation S306, the host 310 may transmit a doorbell for the submission queue 311 to the switch 320 (①), and the switch 320 may receive the doorbell (①). In operation S309, the switch 320 may transmit (forward, relay, retransmit, etc.) the doorbell to the storage device 330 (①). In operation S313, the switch 320 may read or parse the doorbell. The doorbell parser 321 of the switch 320 may read or parse the doorbell. In operation S316, based on the doorbell, the doorbell parser 321 may request the command of the submission queue 311 of the host 310 and may transmit the request to the host 310 (①). For example, the doorbell parser 321 may access the submission queue 311 indicated by (corresponding to) an address of the doorbell, from among one or more submission queues of the host 310. In operation S319, the controller 331 of the storage device 330 may read or parse the doorbell of the doorbell register 332.

Because the switch 320 may parse the doorbell in operation S313 after transmission of the doorbell to the storage device 330 in operation S309, the switch 320 and the storage device 330 may simultaneously parse the doorbell. Alternatively, upon reception of the doorbell from the host 310 in operation S306, the switch 320 may begin to immediately parse the doorbell in operation S313 before transmitting the doorbell to the storage device 330 in operation S309. In this regard, the switch 320 may effect a copy of the doorbell to both parse and transmit the doorbell to the storage device 330, or otherwise perform any operation to complete a parse of the doorbell in advance of a completion of the parsing of the doorbell by the storage device 330. As a result, latency due to presence of the switch 320 between the host 310 and the storage device 330 with respect to communication therebetween may be reduced.

In operation S323, the storage device 330 may request the command of the submission queue 311 of the host 310 and may transmit the request to the switch 320 (②). For example, operation S313 and operation S316 are similar to operation S319 and operation S323, respectively. In operation S326, the switch 320 may receive the command of the submission queue 311 from the host 310 (③). The reception of the command of the submission queue 311 from the host 310 by the switch 320 may be in response to the command request of the switch 320 in operation S316, and thereby latency of the command request of the storage device 330 in operation S323 may be preemptively avoided. The intermediate submission queue buffer 323 of the switch 320 may store the received command. In operation S329, the switch 320 may transmit the command of the intermediate submission queue buffer 323 to the storage device 330 in response to the request in operation S323 (③). In an instance in which the command of the intermediate submission queue buffer 323 is received by the switch 320 in operation S326 before the command request from the storage device 330 is received in operation S323, then the switch 320 may buffer the command of the intermediate submission queue buffer 323 until the command request is received from the storage device 330. The DMA engine 333 of the controller 331 may receive the command and may store the received command in the submission queue buffer 334.

The doorbell parser 321 of the switch 320 may request the command written in the submission queue 311 of the host 310 based on the doorbell during at least a portion of a period of parsing the received doorbell and transmitting the received doorbell to the storage device 330. The switch 320 may receive, from the host 310, the command written in the submission queue 311 of the host 310 during at least a portion of a period of transmitting the doorbell to the storage device 330 and receiving a request for a command from the storage device 330.

An order of operation S309 to S326 is not limited to the example illustrated in FIG. 7. For example, operation S309 and operation S313 may be performed at the same time. For example, operation S326 may be performed prior to operation S323. In any case, the switch 320 may request the command written in the submission queue 311 of the host 310 based on the doorbell, for example at the same time, while transmitting the received doorbell to the storage device 330. As illustrated by shading in FIG. 6, at least a portion of a latency necessary for the request of the operation S316 transmitted by the doorbell parser 321 to arrive at the host 310 may overlap a latency necessary for the doorbell of the operation S309 transmitted by the switch 320 to arrive at the storage device 330 or a latency necessary for the request of the operation S323 transmitted by the storage device 330 to arrive at the switch 320. As illustrated by shading in FIG. 6, at least a portion of a latency necessary for the command of the operation S326 transmitted from the host 310 to arrive at the switch 320 may overlap a latency necessary for the doorbell of the operation S309 transmitted by the switch 320 to arrive at the storage device 330 or a latency necessary for the request of the operation S323 transmitted by the storage device 330 to arrive at the switch 320. Compared with the switch 220, the switch 320 may obfuscate the latency necessary to request the command corresponding to the doorbell, by using the doorbell parser 321.

In operation S333, the switch 320 may determine whether the command received in operation S326 is a write command. When the command received in operation S326 is the write command (Y), the switch 320 may parse the command to obtain a physical region page (PRP) or a scatter gather list (SGL) in operation S336. Here, the PRP or the SGL may be an address included in the command received in operation S326, and the address may indicate a particular data storage area (location) of the data buffer 313 or a particular data storage area of the storage device 330. In operation S339, the switch 320 may request write data of the data buffer 313 of the host 310 and may transmit the request to the host 310 (③). For example, the command parser 322 of the switch 320 may perform operation S333 to S339. In operation S343, the storage device 330 may determine whether the command received in operation S329 is a write command. When the command received in operation S329 is the write command (Y), the storage device 330 may parse the command to get the PRP or the SGL in operation S346. In operation S349, the storage device 330 may request the write data of the data buffer 313 of the host 310 and may transmit the request to the switch 320 (④). The DMA engine 333 may request the write data. In operation S353, the switch 320 may receive the write data of the data buffer 313 from the host 310 (⑤). The intermediate write buffer 324 of the switch 320 may store the received write data. In operation S356, the switch 320 may transmit the write data stored in the intermediate write buffer 324 to the storage device 330 in response to the request received in operation S349 (⑤). The DMA engine 333 may receive the write data and may store the received write data in the write buffer 335. For example, operation S333, operation S336, operation S339, and operation S353 may be similar to operation S343, operation S346, operation S349, and operation S356, respectively.

As similarly described above with respect to the doorbell, the command parser 322 of the switch 320 may request the write data stored in the data buffer 313 of the host 310 based on the command or the address included in the command before or during at least a portion of a period of parsing the received command and transmitting the received command to the storage device 330. The switch 320 may receive, from the host 310, the write data stored in the data buffer 313 of the host 310 before or during at least a portion of a period of transmitting the command to the storage device 330 and receiving a request for the write data from the storage device 330. As a result of preemptively processing the command, latency due to presence of the switch 320 between the host 310 and the storage device 330 with respect to communication therebetween may be reduced.

An order of operation S329 to S356 is not limited to the example illustrated in FIG. 7. For example, operation S329 and operation S333 may be performed at the same time. For example, operation S353 may be performed prior to operation S349. In any case, the switch 320 may request the command stored in the data buffer 313 of the host 310 based on the write command, for example at the same time, while transmitting the received write command to the storage device 330. As illustrated by shading in FIG. 6, at least a portion of a latency necessary for the request of the operation S339 transmitted by the command parser 322 to arrive at the host 310 may overlap a latency necessary for the write command of the operation S329 transmitted by the switch 320 to arrive at the storage device 330 or a latency necessary for the request of the S349 transmitted by the storage device 330 to arrive at the switch 320. As illustrated by shading in FIG. 6, at least a portion of a latency necessary for the write data of the operation S353 transmitted from the host 310 to arrive at the switch 320 may overlap a latency necessary for the write command of the operation S329 transmitted by the switch 320 to arrive at the storage device 330 or a latency necessary for the request of the operation S349 transmitted by the storage device 330 to arrive at the switch 320. Compared with the switch 220, the switch 320 may obfuscate the latency necessary to request the write data corresponding to the write command, by using the command parser 322.

In operation S343, when the command received in operation S329 is not the write command (N) or after operation S356, in operation S359, the storage device 330 may process the command. For example, when the command received in operation S329 is the write command, the controller 331 may store the write data in the nonvolatile memory 339. Operation S343, operation S346, operation S349, and operation S356 may be included in operation S359. For example, when the command received in operation S329 is a read command, the controller 331 may transmit read data stored in the nonvolatile memory 339 to the switch 320. The switch 320 may receive the read data and may transmit the received read data to the host 310. For example, the read data may be stored in the data buffer 313 of the host 310.

In operation S363, the storage device 330 may transmit completion information about the command to the switch 320 (⑥), and the switch 320 may receive the completion information (⑥). When the command received in operation S326 is not the write command (N) or after operation S356, in operation S366, the switch 320 may transmit the completion information to the host 310 (⑥). The completion information may be stored or written in the completion queue 312 of the host 310.

In an embodiment, the components 321 to 324 of the switch 320 may be implemented in a hardware configuration, in a software configuration, or in a combination of hardware and software. In the case of using hardware, the components 321 to 324 may be variously implemented by using a register, a latch, a flip-flop, a logic circuit, a logic gate, etc. The intermediate submission queue buffer 323 and the intermediate write buffer 324 may correspond to areas assigned on an on-chip memory included in the switch 320. In an embodiment, the components 332 to 335 of the controller 331 may be implemented in a hardware configuration, in a software configuration, or in a combination of hardware and software.

In an embodiment, the host 310 may not directly access the intermediate submission queue buffer 323 and the intermediate write buffer 324 of the switch 320, and the submission queue buffer 334 and the write buffer 335 of the controller 331 of the storage device 330. The host 310 may directly access the doorbell register 332 of the controller 331 of the storage device 330 through the switch 320 without a request of the switch 320 or the storage device 330. When the host 310 updates the doorbell of the doorbell register 332, by performing operation S309 to operation S356 of FIG. 7, the switch 320 and the storage device 330 may obtain a command written in the submission queue 311 of the host 310 or write data stored in the data buffer 313 and may store the command or write data in the above components 323, 324, 334, and 335.

Figure 8:
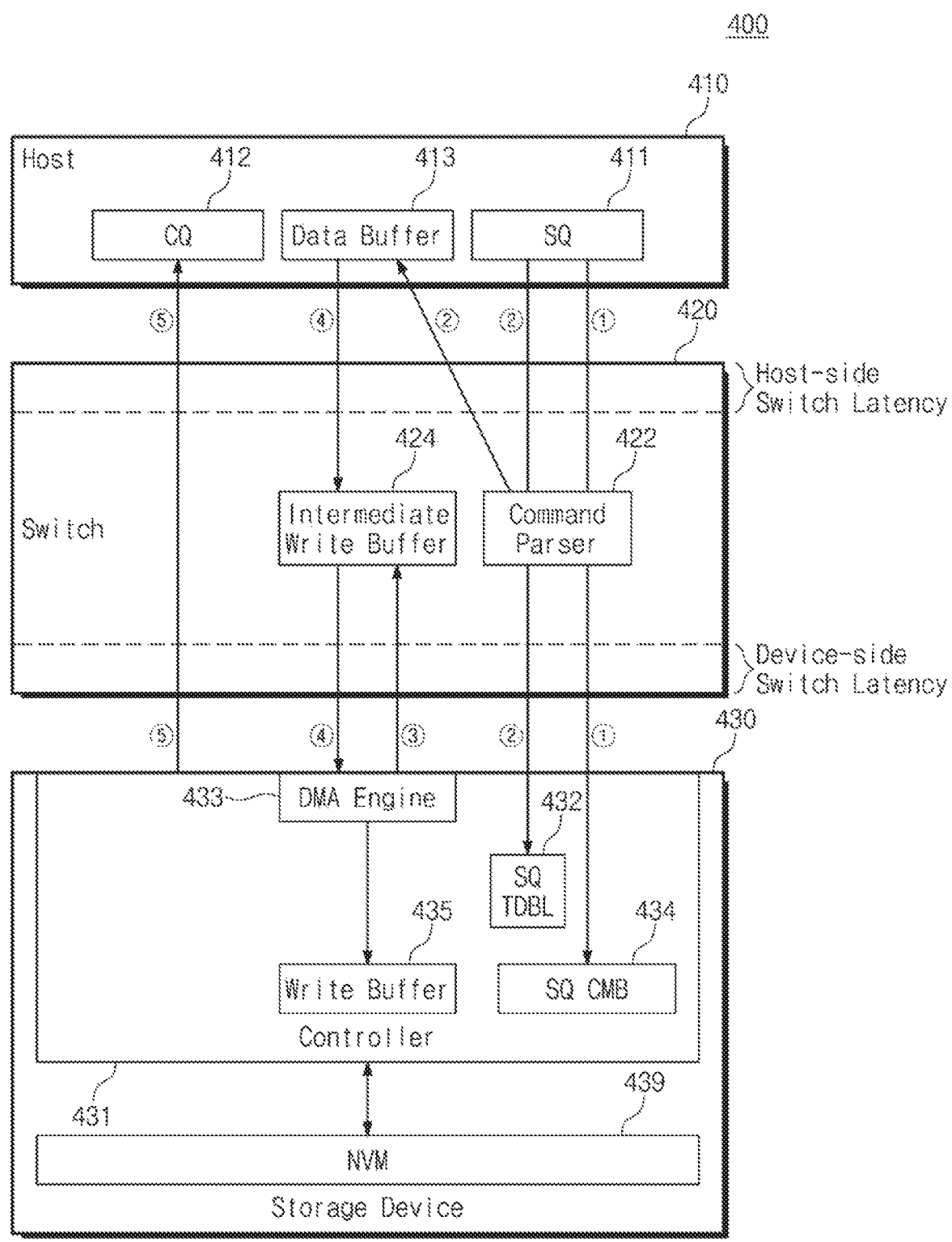
FIG. 8 illustrates a block diagram of the computing system of FIG. 1.
Figure 9:
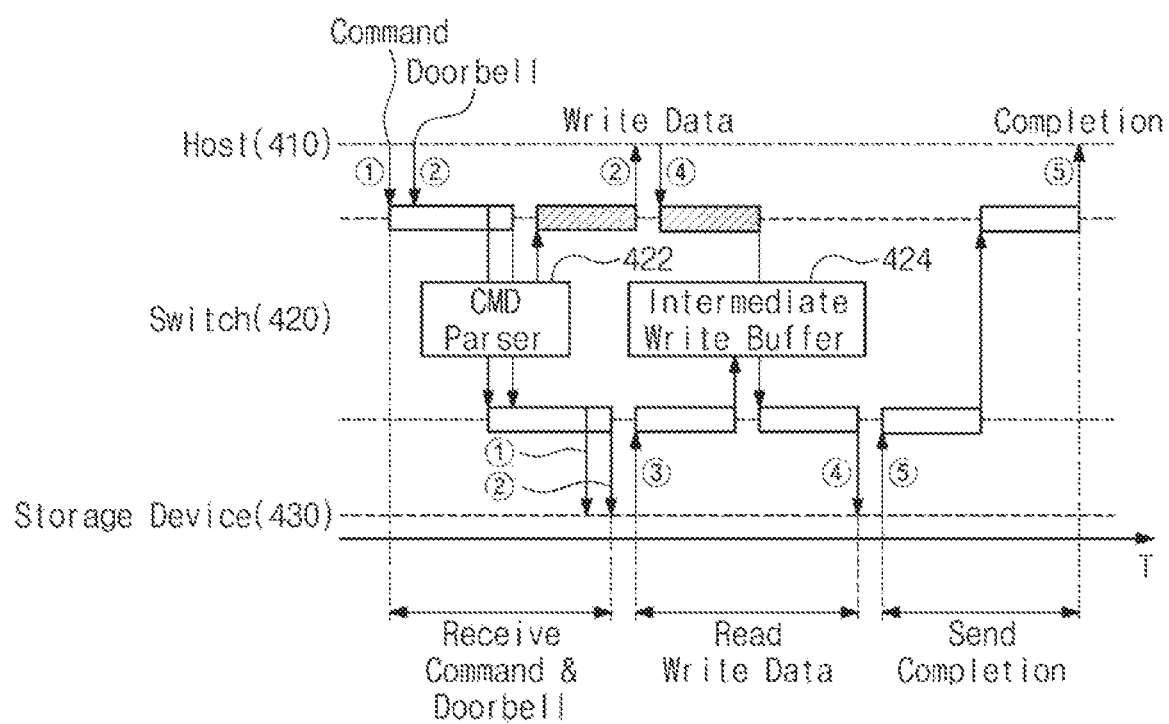
FIG. 9 illustrates a timing diagram of the computing system of FIG. 8.
Figure 10:
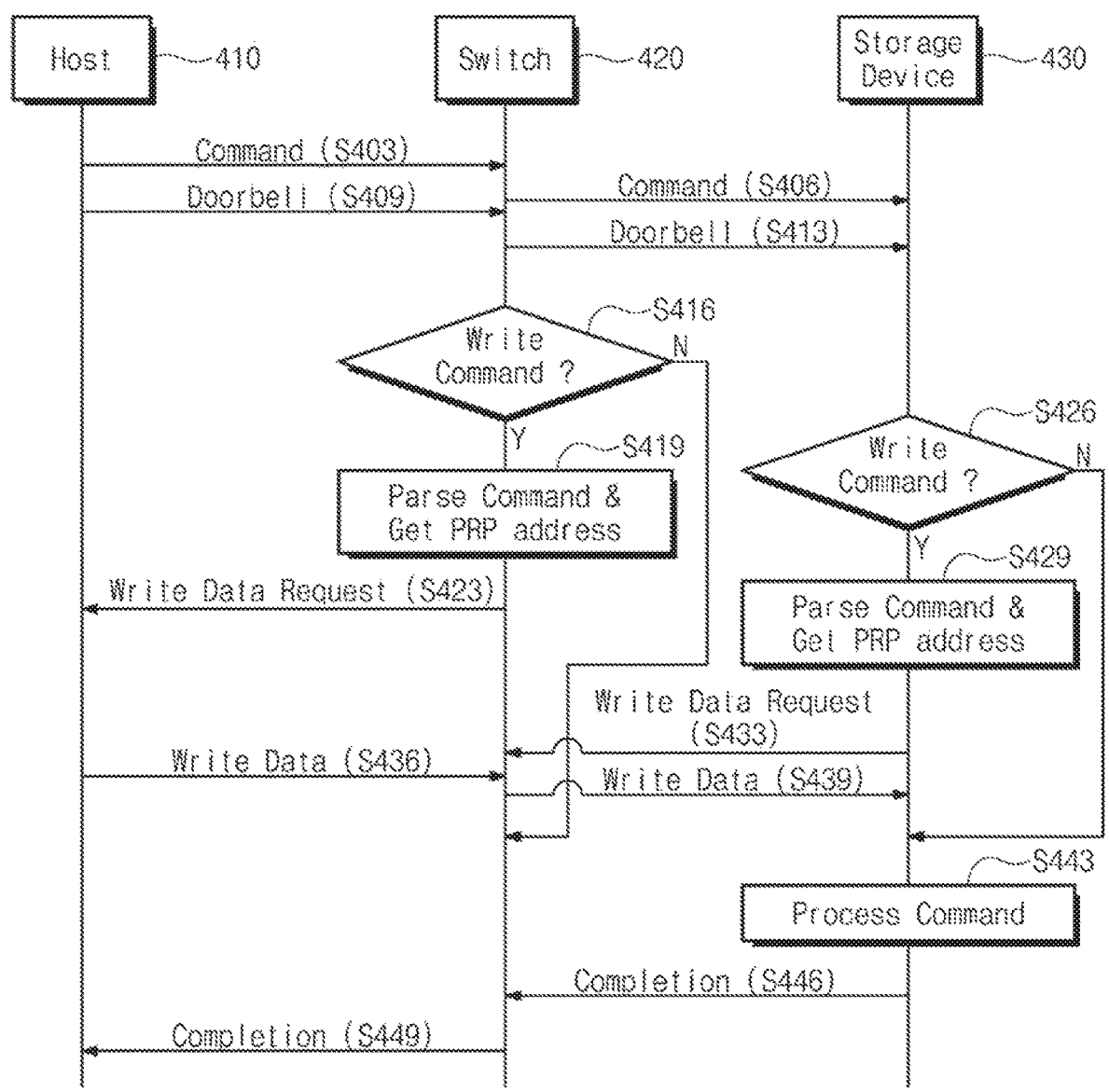
FIG. 10 illustrates a method of operating a computing system of FIG. 8.

FIG. 8 illustrates a block diagram of the computing system of FIG. FIG. 9 illustrates a timing diagram of a computing system of FIG. 8. FIG. 10 illustrates a method of operating the computing system of FIG. 8. Redundant descriptions of components described above will be omitted and the following description will be focused on a difference between a computing system 400 of FIG. 8 and the computing system 300 of FIG. 5.

As shown in FIG. 8, the computing system 400 may include a host 410, a switch 420, and a storage device 430. The host 410 may include a submission queue 411, a completion queue 412, and a data buffer 413. The components 411 to 413 of the host 410 may be similar to the components 311 to 313 of the host 310, respectively. The switch 420 may include a command parser 422 and an intermediate write buffer 424. The components 422 and 424 of the switch 420 may be similar to the components 322 and 324 of the switch 320, respectively.

The storage device 430 may include a controller 431 and a nonvolatile memory 439. The controller 431 may include a doorbell register 432, a DMA engine 433, a submission queue controller memory buffer (SQ CMB) 434, and a write buffer 435. The components 431, 432, 433, 435, and 439 of the storage device 430 may be similar to the components 331, 332, 333, 335, and 339 of the storage device 330, respectively. However, the submission queue controller memory buffer 434 may be different from the submission queue buffer 334. The host 410 may directly write or store a command in the submission queue controller memory buffer 434. In detail, the host 410 may write the command in the submission queue 411 and may directly write the command written in the submission queue 411 in the submission queue controller memory buffer 434 without a request of the switch 420 or the storage device 430. For example, the submission queue 311 of FIG. 5 may be placed on the submission queue controller memory buffer 434 as a submission queue and may be simultaneously placed on the host memory buffer HMB as the submission queue 411. The same command may be stored in all the submission queues on the submission queue 411 and the submission queue controller memory buffer 434. The size of the submission queue 411 may be smaller than the size of the submission queue 311, and the size of the submission queue on the submission queue controller memory buffer 434 may be identical to the size of the submission queue 311. In contrast, the host 310 may not directly write or store the command of the submission queue 311 in the submission queue buffer 334. Instead, the command may be stored in the submission queue buffer 334 only after the controller 331 performs operation S309, operation S319, operation S323, and operation S329. As the controller 431 includes or supports the submission queue controller memory buffer 434 directly accessible by the host 410, the switch 420 may not include the doorbell parser 321 and the intermediate submission queue buffer 323.

Referring to FIG. 8, FIG. 9, and FIG. 10 in conjunction, the host 410 may store a command for the storage device 430 in the submission queue 411. In operation S403, the host 410 may transmit the command written in the submission queue 411 to the switch 420 (①), and the switch 420 may receive the command (①). In operation S406, the switch 420 may transmit the command to the storage device 430 (①). In operation S409, which may be after operation S403, the host 410 may transmit a doorbell for the submission queue placed on the submission queue controller memory buffer 434 to the switch 420 (②), and the switch 420 may receive the doorbell (②). In operation S413, the switch 420 may transmit the doorbell to the storage device 430 (②). A latency necessary to the storage device 430 to receive a command and a doorbell may be shorter than a latency necessary for the storage device 230/330 to receive both the command and the doorbell.

Operation S416 to operation S449 in FIG. 10 are similar to operation S333 to operation S366 in FIG. 7. The switch 420 may perform operation S416 to operation S423, may request write data of the data buffer 413, and may transmit a request to the host 410 (②). The storage device 430 may perform operation S426 to operation S433, may request write data of the data buffer 413, and may transmit a request to the switch 420 (③). The switch 420 may perform operation S436 and may receive the write data of the data buffer 413 from the host 410 (④). The switch 420 may perform operation S436 and operation S439, may store write data in the intermediate write buffer 424, and may transmit the write data stored in the intermediate write buffer 424 to the storage device 430 (④). The storage device 430 may perform operation S439 to operation S446 and may transmit completion information about the command to the switch 420 (⑤). In operation S449, the switch 420 may transmit the completion information to the host 410 (⑤).

Figure 11:
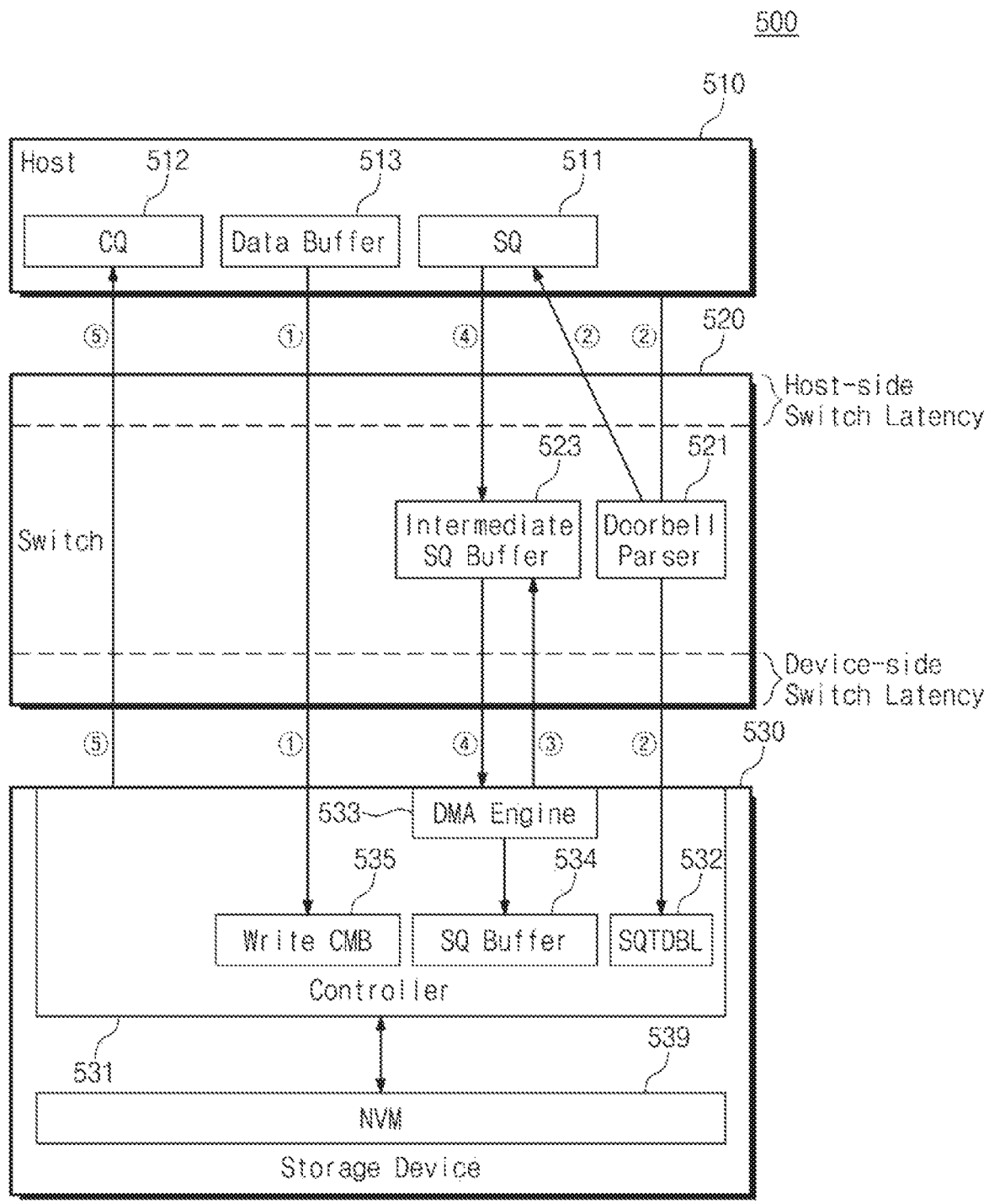
FIG. 11 illustrates a block diagram of the computing system of FIG. 1.
Figure 12:
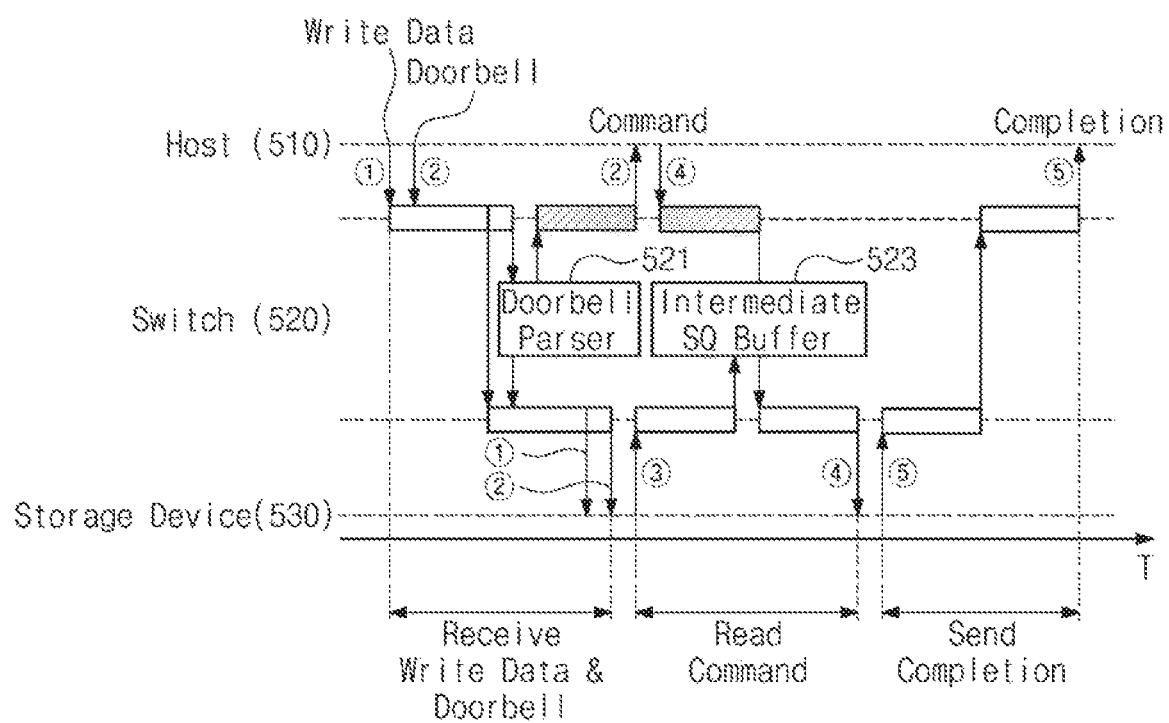
FIG. 12 illustrates a timing diagram of a computing system of FIG. 11.
Figure 13:
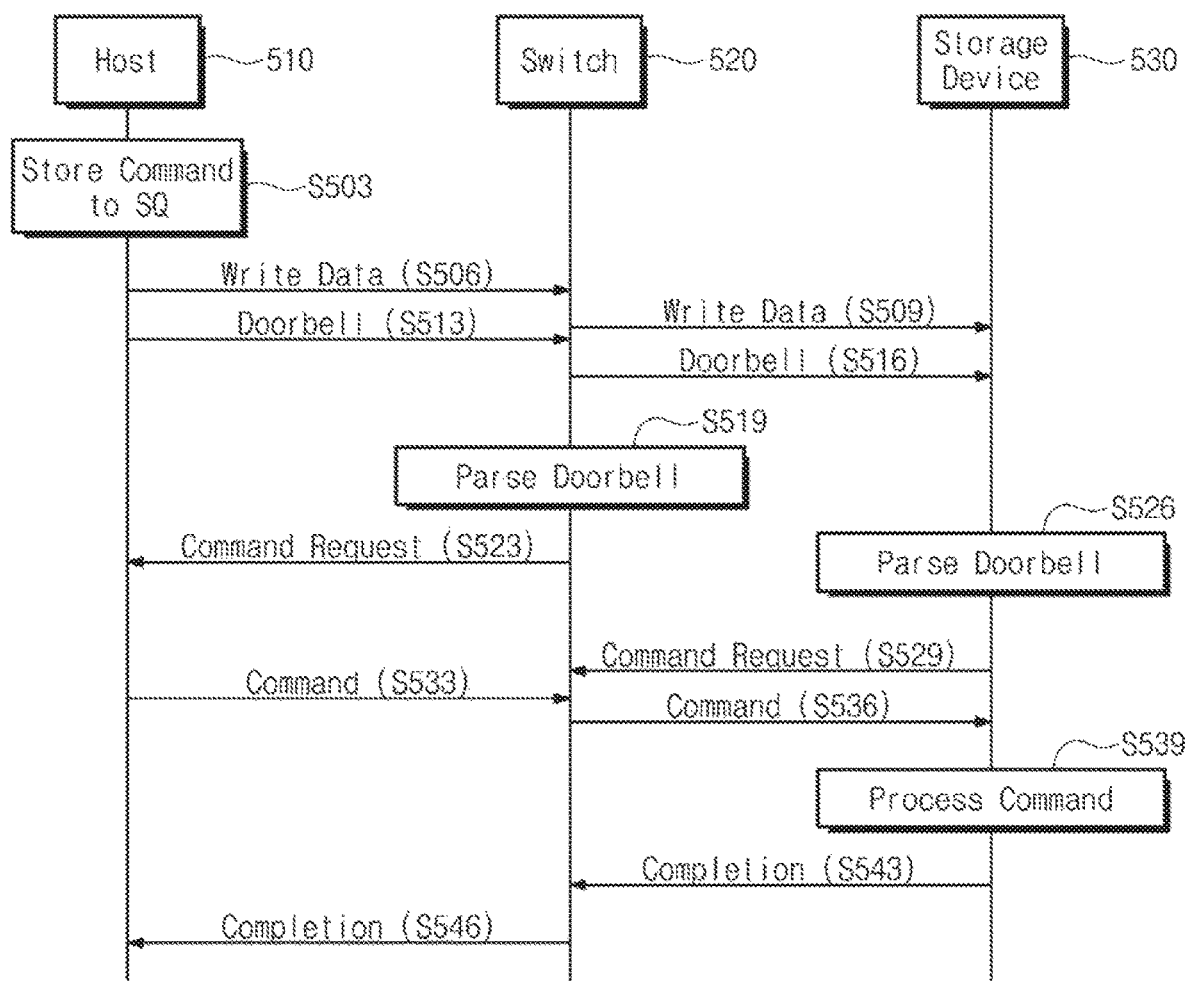
FIG. 13 illustrates a method of operating the computing system of FIG. 11.

FIG. 11 illustrates a block diagram of the computing system of FIG. FIG. 12 illustrates a timing diagram of a computing system of FIG. 11. FIG. 13 illustrates a method of operating the computing system of FIG. 11. Redundant descriptions of components described above will be omitted and the following description will be focused on a difference between a computing system 500 of FIG. 11 and the computing system 300 of FIG. 5.

As show in FIG. 11, the computing system 500 may include a host 510, a switch 520, and a storage device 530. The host 510 may include a submission queue 511, a completion queue 512, and a data buffer 513. The components 511 to 513 of the host 510 of FIG. 11 may be similar to the components 311 to 313 of the host 310 of FIG. 5, respectively. The switch 520 may include a doorbell parser 521 and an intermediate submission queue buffer 523. The components 521 and 523 of the switch 520 of FIG. 11 may be similar to the components 321 and 323 of the switch 320 of FIG. 5, respectively.

The storage device 530 may include a controller 531 and a nonvolatile memory 539. The controller 531 may include a doorbell register 532, a DMA engine 533, a submission queue buffer 534, and a write controller memory buffer (write CMB) 535. The components 531, 532, 533, 534, and 539 of the storage device 530 of FIG. 11 may be similar to the components 331, 332, 333, 334, and 339 of the storage device 330 of FIG. 5, respectively. However, the write controller memory buffer 535 may be different from the write buffer 335. The host 510 may directly store the write data in the write controller memory buffer 535. In detail, the host 510 may store the write data in the data buffer 513 and may directly store the write data stored in the data buffer 513 in the write controller memory buffer 535 through the switch 520 without a request of the switch 520 or the storage device 530. For example, the data buffer 513 of FIG. 5 may be placed on the write controller memory buffer 535 as a data buffer and may be simultaneously placed on the host memory buffer HMB as the data buffer 513. The same command may be stored in all the data buffers on the data buffer 513 and the write controller memory buffer 535. The size of the data buffer 513 may be smaller than the size of the data buffer 313, and the size of the data buffer on the write controller memory buffer 535 may be identical to the size of the data buffer 313. In contrast, the host 310 may not directly store the write data of the data buffer 313 in the write buffer 335. Instead, the command may be stored in the write buffer 335 only after the controller 331 performs operation S343, operation S346, operation S349, and operation S356. As the controller 531 includes the write controller memory buffer 535 directly accessible by the host 510, the switch 520 may not include the command parser 322 and the intermediate write buffer 324.

Referring to FIG. 11, FIG. 12, and FIG. 13 in conjunction, operation S503, operation S506, and operation S509 may be similar to operation S303, operation S353, and operation S356, respectively. In operation S503, the host 510 may store a command for the storage device 530 in the submission queue 511. When the command received in operation S503 is the write command, in operation S506, the host 510 may transmit the write data to switch 520 (①). In operation S509, the switch 520 may transmit the write data to the storage device 530 (①). A latency necessary to the storage device 530 to receive the write data may be shorter than a latency necessary for the storage device 230/330/430 to receive the write data. When the command is not the write command, operation S506 and operation S509 may be omitted.

Operation S513 to operation S536 are similar to operation S306 to operation S329. The host 510 may perform operation S513 and may transmit a doorbell for the submission queue 511 to the switch 520 (②). The switch 520 may perform operation S513 to operation S523, may transmit a doorbell to the storage device 530 (②), may request the command of the submission queue 511, and may transmit the request to the host 510 (②). The storage device 530 may perform operation S516, operation S526, and operation S529, may request the command of the submission queue 511, and may transmit the request to the switch 520 (③). The switch 520 may perform operation S533 and operation S536, may receive the command of the submission queue 511 from the host 510 (④), and may transmit the command stored in the intermediate submission queue buffer 523 to the storage device 530 (④). The storage device 530 may perform operation S536 and may receive the command (④). The storage device 530 may perform operation S539 and operation S543 and may transmit completion information about the command to the switch 520 (⑤). In operation S546, the switch 520 may transmit the completion information to the host 510 (⑤).

Figure 14:
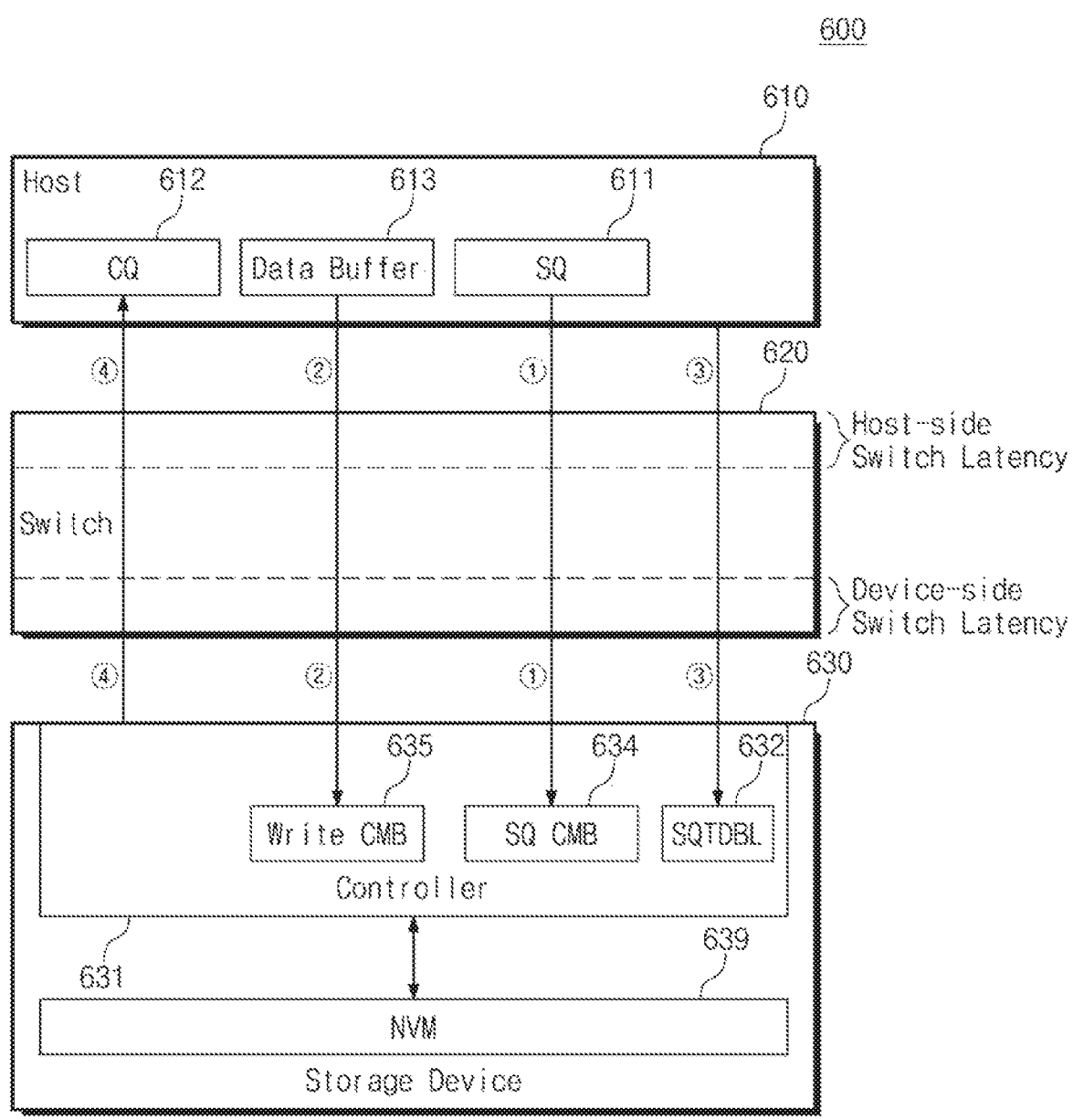
FIG. 14 illustrates a block diagram of the computing system of FIG. 1.
Figure 15:
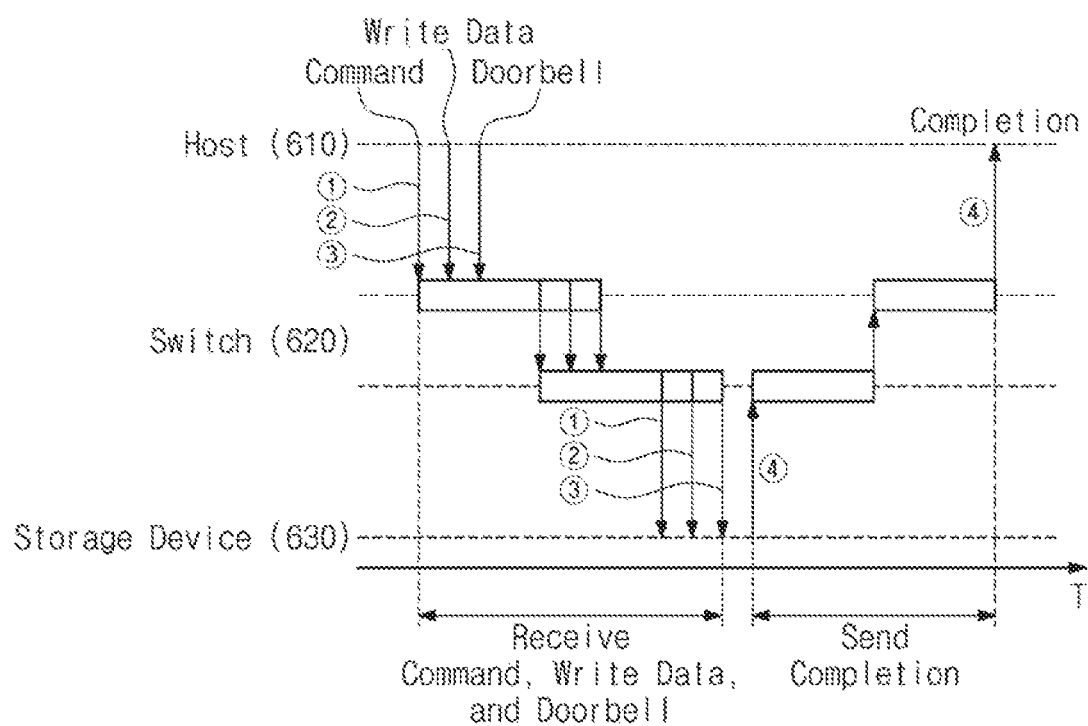
FIG. 15 illustrates a timing diagram of a computing system of FIG. 14.

FIG. 14 illustrates a block diagram of the computing system of FIG. 1. FIG. 15 illustrates a timing diagram of the computing system of FIG. 14. Redundant descriptions of components described above will be omitted and the following description will be focused on a difference between a computing system 600 of FIG. 14 and the computing systems 300 of FIG. 5, 400 of FIG. 8, and 500 of FIG. 11.

The computing system 600 may include a host 610, a switch 620, and a storage device 630. The host 610 may include a submission queue 611, a completion queue 612, and a data buffer 613. The components 611, 612, and 613 of the host 610 in FIG. 14 may be similar to the components 411 and 412 of the host 410 of FIG. 8 and the component 513 of the host 510 of FIG. 11, respectively. The switch 620 of FIG. 11 may be similar to the switch 220 of FIG. 3.

The storage device 630 may include a controller 631 and a nonvolatile memory 639. The controller 631 may include a doorbell register 632, a submission queue controller memory buffer 634, and a write controller memory buffer 635. The components 631, 632, 634, 635, and 639 of the storage device 630 of FIG. 11 may be similar to the components 331 and 332 of the storage device 330 of FIG. 5, the component 434 of the storage device 430 of FIG. 8, the component 535 of the storage device 530 of FIG. 11, and the component 339 of the storage device 330 of FIG. 5, respectively. Although not illustrated in drawings, the controller 631 may further include a DMA engine. As the controller 631 includes the submission queue controller memory buffer 634 and the write controller memory buffer 635 directly accessible by the host 610, the switch 620 may not include the components 321 to 324 of the switch 320.

Referring to FIG. 14 and FIG. 15 in conjunction, the host 610 may store a command for the storage device 630 in the submission queue 611. The host 610 may transmit the command of the submission queue 611 to the switch 620 (①). The switch 620 may transmit the command to the storage device 630 (①). When the command is a write command, the host 610 may transmit the write data to switch 620 (②). The switch 620 may transmit the write data to the storage device 630 (②). When the command is not the write command, the transmission of the write data may be omitted. As illustrated in FIGS. 14 and 15, the write data may be transmitted prior to the command, or both the write data and the command may be transmitted at the same time. After transmitting the command and the write data to the switch 620, the host 610 may transmit a doorbell for the submission queue 611 to the switch 620 (③). The switch 620 may transmit the doorbell to the storage device 630 (③). A latency necessary to the storage device 630 to receive a command, write data, and a doorbell may be shorter than a latency necessary for the storage device 230/330/530 to receive all of the command, the write data, and the doorbell. The storage device 630 may process a command. The storage device 630 may transmit completion information about the command to the switch 620 (④). The switch 620 may transmit the completion information to the host 610 (④).

Figure 16:
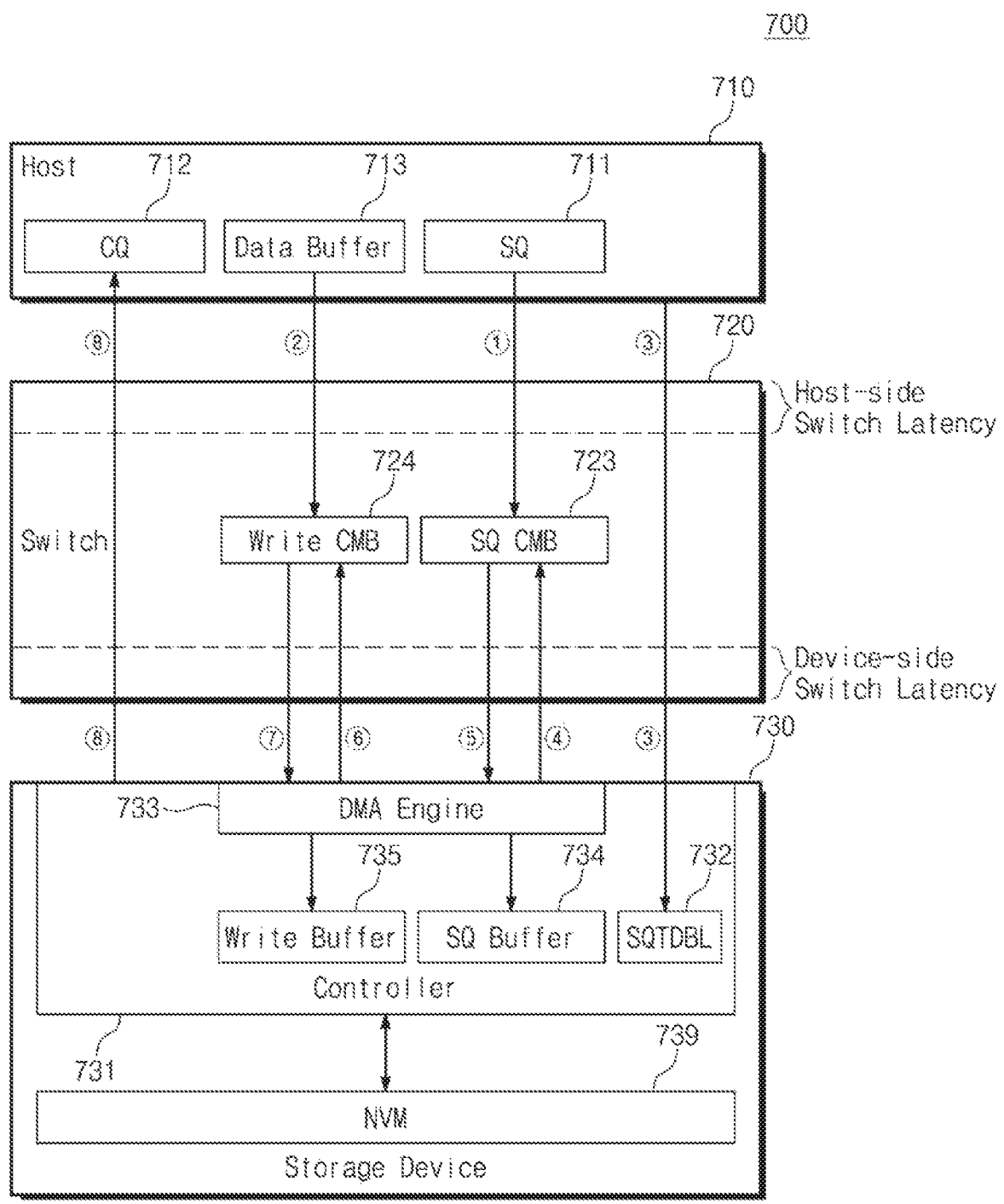
FIG. 16 illustrates a block diagram of the computing system of FIG. 1.
Figure 17:
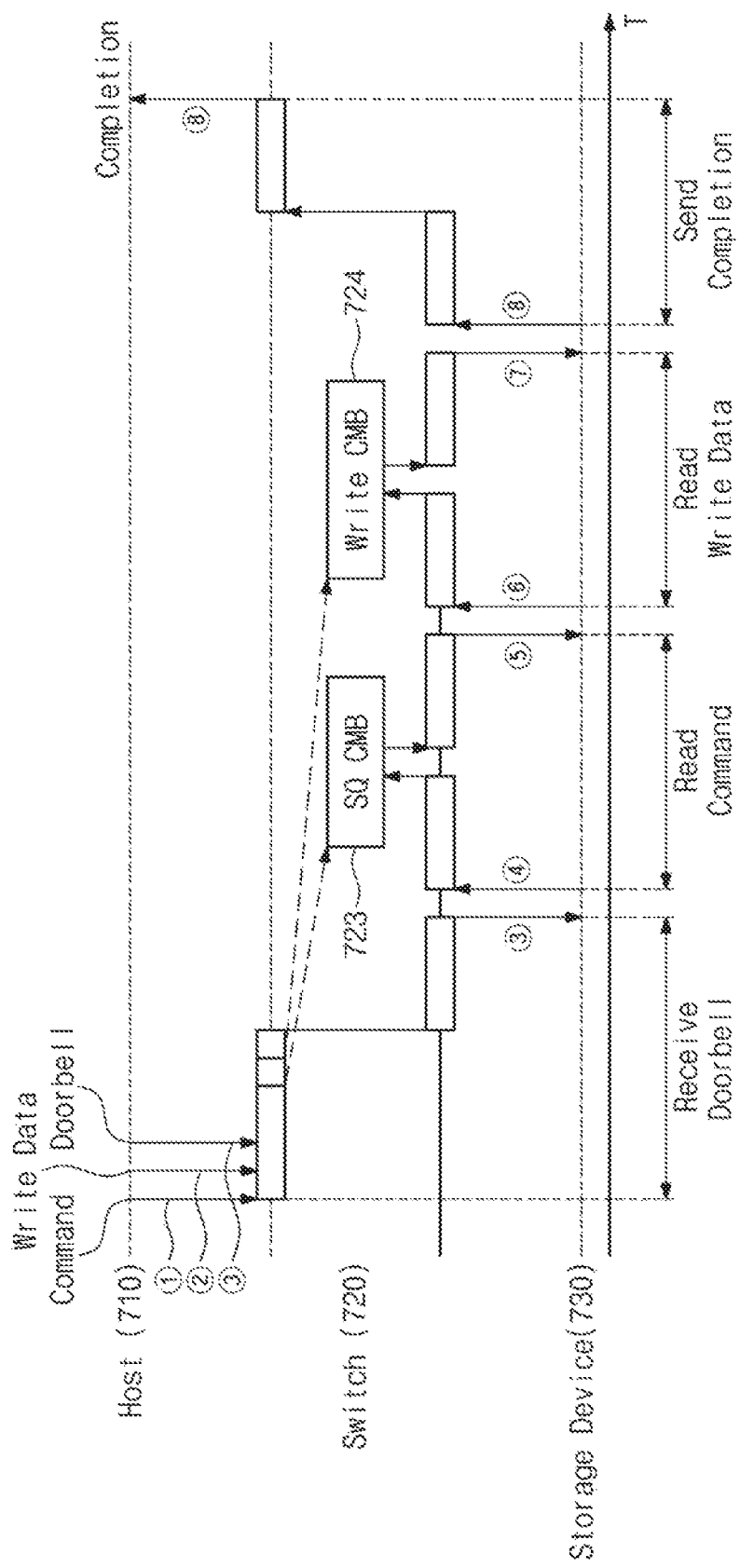
FIG. 17 illustrates a timing diagram of the computing system of FIG. 16.
Figure 18:
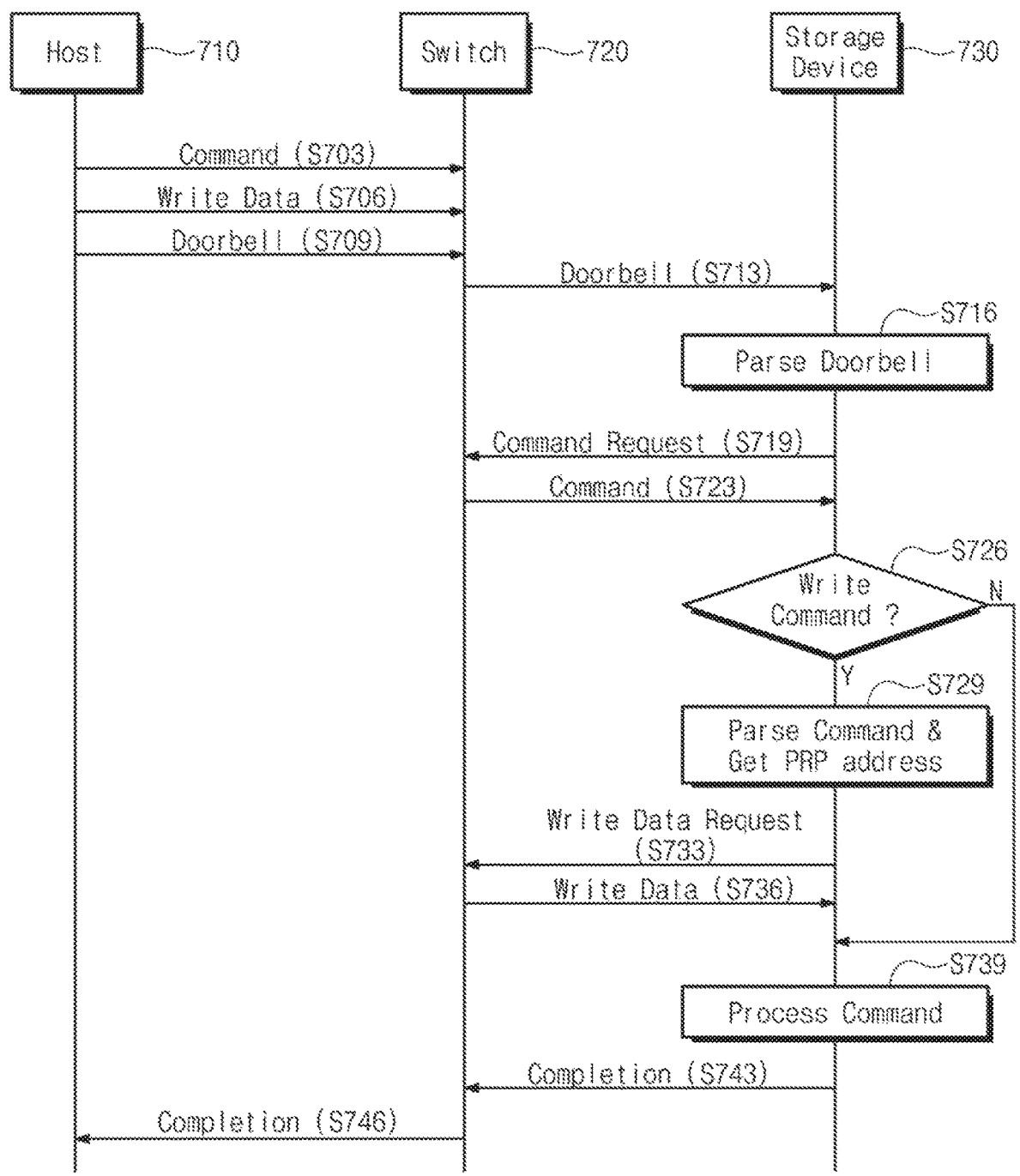
FIG. 18 illustrates a method of operating the computing system of FIG. 16.

FIG. 16 illustrates a block diagram of the computing system of FIG. 1. FIG. 17 illustrates a timing diagram of the computing system of FIG. 16. FIG. 18 illustrates a method of operating the computing system of FIG. 16. Redundant descriptions of components described above will be omitted and the following description will be focused on a difference between a computing system 700 in FIG. 16 and the computing systems 300 in FIGS. 5 and 600 in FIG. 14.

The computing system 700 may include a host 710, a switch 720, and a storage device 730. The host 710 may include a submission queue 711, a completion queue 712, and a data buffer 713. The components 711 to 713 of the host 710 in FIG. 16 may be similar to the components 611 to 613 of the host 610 in FIG. 14, respectively. The storage device 730 may include a controller 731 and a nonvolatile memory 739. The controller 731 may include a doorbell register 732, a DMA engine 733, a submission queue buffer 734, and a write buffer 735. The components 731, 732, 733, 734, 735, and 739 of the storage device 730 in FIG. 16 may be similar to the components 331, 332, 333, 334, 335, and 339 of the storage device 330 in FIG. 5, respectively.

The switch 720 may include a submission queue controller memory buffer 723 and a write controller memory buffer 724. An operation of the submission queue controller memory buffer 723 may be similar to the operation of the submission queue controller memory buffer 434. The host 710 may directly write or store a command in the submission queue controller memory buffer 723 of the switch 720. In contrast, the host 710 may not directly write or store the command in the submission queue buffer 734 of the controller 731 of the storage device 730. An operation of the write controller memory buffer 724 may be similar to the operation of the write controller memory buffer 535. The host 710 may directly store the write data in the write controller memory buffer 724 of the switch 720. In contrast, the host 710 may not directly store the write data in the write buffer 735 of the controller 731 of the storage device 730.

Referring to FIG. 15, FIG. 16, and FIG. 17 in conjunction, in operation S703, the host 710 may transmit a command of the submission queue 711 to the switch 720 (①). The submission queue controller memory buffer 723 may store the command received in operation S703. When the command is a write command, in operation S706, the host 710 may transmit the write data of the data buffer 713 to the switch 720 (②). The write controller memory buffer 724 may store the write data received in operation S706. Unlike the example illustrated in FIGS. 16 to 18, the write data may be transmitted prior to the command, or both the write data and the command may be transmitted at the same time. After operation S703 and operation S706, in operation S709, the host 710 may transmit a doorbell for the submission queue 711 to the switch 720 (③). Operation S713 may be similar to operation S309. The switch 720 may perform operation S713 and may transmit the doorbell to the storage device 730 (③).

Operation S716, operation S719, operation S723, operation S726, operation S729, operation S733, operation S736, operation S739, operation S743, and operation S746 in FIG. 18 are similar to operation S319, operation S323, operation S329, operation S343, operation S346, operation S349, operation S356, operation S359, operation S363, and operation S366 in FIG. 7, respectively. The storage device 730 may perform operation S716 and operation S719, may request the command of the submission queue 711, and may transmit the request to the switch 720 (④). The switch 720 may perform operation S723 and may transmit the command of the submission queue controller memory buffer 723 to the storage device 730 (⑤). The storage device 730 may perform operation S726, operation S729, and operation S733, may request the write data of the data buffer 713, and may transmit the request to the switch 720 (⑥). The switch 720 may perform operation S736 and may transmit the write data of the write controller memory buffer 724 to the storage device 730 (⑦). The storage device 730 may perform operation S739 and operation S743 and may transmit completion information about the command to the switch 720 (⑧). In operation S746, the switch 720 may transmit the completion information to the host 710 (⑧).

Figure 19:
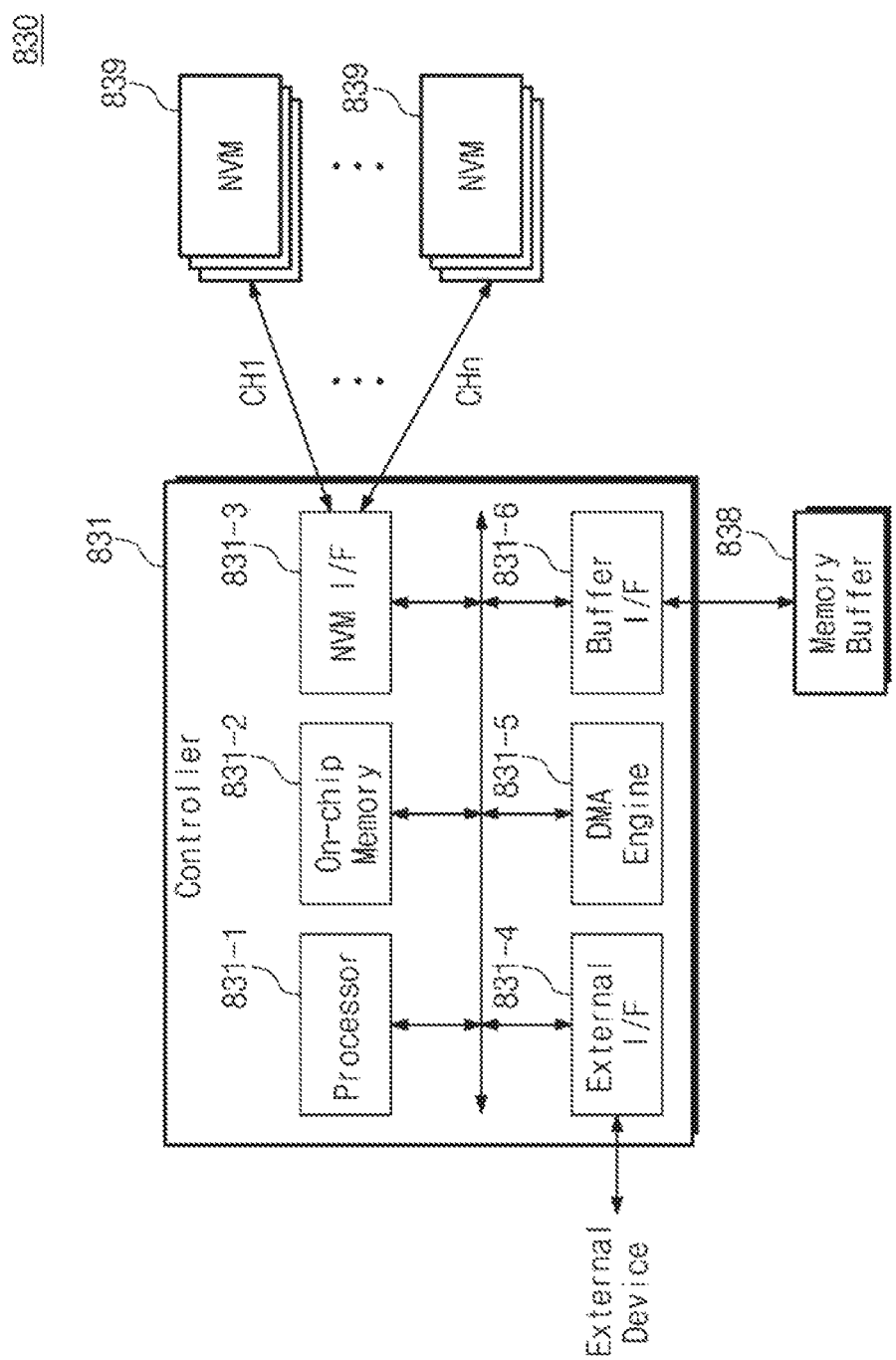
FIG. 19 illustrates a block diagram of a storage device according to an embodiment.

FIG. 19 illustrates a block diagram of a storage device according to an embodiment.

The storage device 830 of FIG. 19 is described with reference to FIGS. 3 to 18. The storage device 830 may be one of the storage devices 230 to 730. The storage device 830 may include a controller 831, a memory buffer 838, and nonvolatile memories 839.

The controller 831 may be implemented with an SoC, an ASIC, or an FPGA, etc. The controller 831 may include a processor 831-1, an on-chip memory 831-2, a nonvolatile memory interface circuit 831-3, an external interface circuit 831-4, a DMA engine 831-5, and a buffer interface circuit 831-6. The processor 831-1 may control the components 831-2 to 831-6 of the controller 831. The processor 831-1 may include at least one or more cores (e.g., a homogeneous multi-core or a heterogeneous multi-core) and an internal cache memory. The processor 831-1 may execute a program code, software, an application program, etc. loaded onto the on-chip memory 831-2 or the memory buffer 838.

The on-chip memory 831-2 may include a latch, a register, an SRAM, a DRAM, a thyristor random access memory (TRAM), a tightly coupled memory (TCM), etc. A flash translation layer (FTL) may be loaded onto the on-chip memory 831-2. The FTL may manage mapping between a logical address provided from the external and a physical address of the nonvolatile memories 839. The FTL may further perform a garbage collection operation, a wear leveling operation, and the like, as well as the address mapping operation.

The nonvolatile memory interface circuit 831-3 may communicate with the nonvolatile memories 839 in compliance with an interface protocol such as toggle double data rate (DDR). The nonvolatile memory interface circuit 831-3 may communicate with one or more nonvolatile memories 839 through a channel CH1 and may communicate with one or more nonvolatile memories 839 through a channel CHn (n being an integer of 2 or more). The number of channels CH1 to CHn between the controller 831 and the nonvolatile memories 839 may be one or more, the number of nonvolatile memories assigned to one channel may be one or more, and each of the nonvolatile memories 839 may be one of the nonvolatile memories 239 to 739 described with reference to FIGS. 3 to 18. Under control of the processor 831-1, the nonvolatile memory interface circuit 831-3 may transmit the write data transmitted from the outside (e.g., the host 11, the root complex 120, the electronic devices 141, 151, 153, 161, and 162, and the switches 220 to 720: refer to FIGS. 2 to 18) to the nonvolatile memories 839, and the write data may be stored in the nonvolatile memories 839. The nonvolatile memory interface circuit 831-3 may receive the read data transmitted from the nonvolatile memories 839 under control of the processor 831-1.

The external interface circuit 831-4 may communicate with the outside (e.g., the host 11, the root complex 120, the electronic devices 141, 151, 153, 161, and 162, and the switches 220 to 720: refer to FIGS. 2 to 18) in compliance with a communication interface protocol. For example, the interface protocol may be USB, SCSI, PCIe, M-PCIe, NVMe, ATA, PATA, SATA, SAS, IDE, UFS, Firewire, etc.

Under control of the processor 831-1, the DMA engine 831-3 may directly access various memory buffers (e.g., 130, HMB, 211, 213, 323, 324, 424, 523, 723, and 724) of the devices (e.g., the host 11, the root complex 120, the electronic devices 141, 151, 153, 161, and 162, and the switches 220 to 720: refer to FIGS. 2 to 18). For example, the DMA engine 831-5 may access one of the above memory buffers, may receive a command, may receive write data, and may transmit read data of the storage device 830. The DMA engine 831-5 may access various memory buffers 234 to 734 and 235 to 735 of the storage devices 230 to 830, the on-chip memory 831-2, and the memory buffer 838 and may exchange data therewith.

The buffer interface circuit 831-6 may communicate with the memory buffer 838 in compliance with an interface protocol such as a DDR standard. The buffer interface circuit 831-6 may exchange data with the memory buffer 838 under control of the processor 831-1. The memory buffer 838 may include a latch, a register, an SRAM, a DRAM, a TRAM, a TCM, etc. For example, the memory buffer 838 may be provided outside the controller 831 or may be placed inside the storage device 830. For another example, the memory buffer 838 may not be included in the storage device 830. In the configuration that the memory buffer 838 is included in the storage device 830, the processor 831-1 may use, as a cache memory, the memory buffer 838 as well as the on-chip memory 831-2.

In an embodiment, the controller 831 may perform the following operations associated with the storage devices 330 to 730 described with reference to FIGS. 5 to 18: S309, S319, S323, S329, S343, S346, S349, S356, S359, S363, S406, S413, S426, S429, S433, S439, S443, S446, S509, S516, S526, S529, S536, S539, S543, S713, S716, S719, S723, S726, S729, S733, S736, S739, and S743. In another embodiment, an operation of the storage device 830 that is not an endpoint device but an intermediate device may be similar to the operations of the switches 320 to 720 described with reference to FIGS. 5 to 18. In this case, the controller 831 may further include the components 321 to 324, 422, 424, 521, 523, 723, and 724 of the switches 320 to 720. The controller 831 may perform the following operations associated with the switches 320 to 720 described with reference to FIGS. 5 to 18: 306, S309, S313, S316, S323, S326, S329, S333, S336, S339, S349, S353, S356, S363, S366, S403, S406, S409, S413, S416, S419, S423, S433, S436, S439, S446, S449, S506, S509, S513, S516, S519, S523, S529, S533, S536, S543, S546, S703, S706, S709, S713, S719, S723, S733, S736, S743, and S746.

Figure 20:
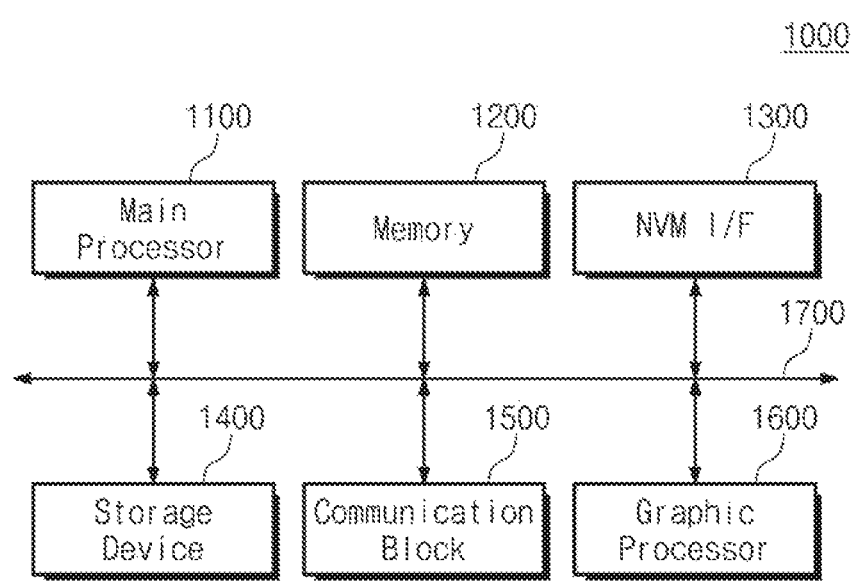
FIG. 20 illustrates a block diagram of a computing device according to an embodiment.

FIG. 20 illustrates a block diagram of a computing device according to an embodiment. In the computing systems 10 and 100 to 700 described with reference to FIGS. 1 to 19, various embodiments of the inventive concept may be applied to a computing device 1000. The computing device 1000 may include a main processor 1100, a memory 1200, a user interface 1300, a storage device 1400, a communication block 1500, and a graphic processor 1600. For example, the computing device 1000 may be referred as a "mobile device."

The main processor 1100 may control overall operations of the computing device 1000. The main processor 1100 may be configured to process various kinds of arithmetic operations or logical operations. The main processor 1100 may be implemented with a dedicated logic circuit, an FPGA, an ASIC, an SoC, etc., which includes one or more processor cores. The main processor 1100 may be implemented with a central processing unit, microprocessor, general-purpose processor, a special-purpose processor, or an application processor. For example, each of the hosts 11 and 210 to 710 and the processor 110 may correspond to the main processor 1100.

The memory 1200 may temporarily store data that is used for an operation of the computing device 1000. The memory 1200 may store data processed or to be processed by the main processor 1100. For example, the memory 130 may correspond to the memory 1200.

The user interface 1300 may perform communication mediation between a user and the computing device 1000 under control of the main processor 1100. For example, the user interface 1300 may process inputs from a keyboard, a mouse, a keypad, a button, a touch panel, a touch screen, a touch pad, a touch ball, a camera, a gyroscope sensor, a vibration sensor, etc. In addition, the user interface 1300 may process outputs that are to be provided to a display device, a speaker, a motor, etc.

The storage device 1400 may include a storage medium capable of storing data regardless of whether a power is supplied. For example, the storage device 1400 may be one of the electronic devices 12, 13, 141, 142, 151 to 154, and 161 to 163, the switches 220 to 720, or the storage devices 230 to 730 described with reference to FIGS. 1 to 19. The storage device 1400 may be an intermediate device, another intermediate device and another endpoint device connected to the storage device 1400 may be further included in the computing device 1000.

The communication block 1500 may communicate with an external device/system of the computing device 1000 under control of the main processor 1100. For example, the communication block 1500 may communicate with the external device/system of the computing device 1000 based on at least one of various wired communication protocols, such as an Ethernet, a transfer control protocol/Internet protocol (TCP/IP), a universal serial bus (USB), and Firewire and/or at least one of various wireless communication protocols, such as long term evolution (LTE), worldwide interoperability for microwave access (WiMax), global system for mobile communications (GSM), code division multiple access (CDMA), Bluetooth, near field communication (NFC), wireless-fidelity (Wi-Fi), and radio frequency identification (RFID).

The graphic processor 1600 may be a graphics processing unit (GPU) and may include a plurality of processor cores (e.g., graphic processing units). The processor cores included in the graphic processor 1600 may quickly process graphic data in parallel. For example, the graphic processor 1600 may process various graphic operations, such as pixel shader, super-sampling, and color space transform, by using the processor cores.

Each of the main processor 1100, the memory 1200, the user interface 1300, the storage device 1400, the communication block 1500, and the graphic processor 1600 may be implemented with a device of a circuit level, a chip level, and/or a package level so as to be mounted in the computing device 1000. Alternatively, each of the main processor 1100, the memory 1200, the user interface 1300, the storage device 1400, the communication block 1500, and the graphic processor 1600 may be implemented with an independent electronic device so as to assembled within the computing device 1000. The mounted or assembled components may be connected to each other over a bus 1700.

The bus 1700 may provide a communication path of wires between the components of the computing device 1000. The components of the computing device 1000 may exchange data with each other based on a bus format of the bus 1700. For example, the bus format may include one or more of various protocols such as PCIe, NVMe, SCSI, ATA, PATA, SATA, SAS, and UFS.

According to an embodiment of the inventive concept, a communication speed between an endpoint device and a host may be improved by using a buffer of an electronic device placed between the endpoint device and the host.

While the inventive concept has been described with reference to embodiments thereof, it will be apparent to those of ordinary skill in the art that various changes and modifications may be made thereto without departing from the spirit and scope of the inventive concept as set forth in the following claims.

What is claimed is:

1. A computing system comprising:
   a host;
   a first electronic device coupled to the host; and
   a second electronic device coupled to the first electronic device, the second electronic device configured to communicate with the host through the first electronic device,
   wherein the first electronic device is configured to:
      request the host to transmit a write command written in a submission queue of the host based on a doorbell received from the host;
      store the write command received from the host;
      transmit the write command to the second electronic device;
      request, at a first time, the host to transmit write data of the write command stored in a data buffer of the host;
      store the write data received from the host; and
      receive, from the second electronic device, a write data request directed to the host at a second time after the first time, and
   wherein the first electronic device is further configured to:
      request the host to transmit a read command written in the submission queue of the host;
      store the read command received from the host;
      receive read data of the read command transmitted from the second electronic device receiving the read command; and
      transmit the read data to the host.

2. The computing system of claim 1, wherein the first electronic device is a peripheral component interconnect express (PCIe) switch, and wherein the second electronic device a non-volatile memory express (NVMe) device.

3. The computing system of claim 1, wherein the first electronic device comprises:
   an intermediate submission queue buffer configured to store the write command; and
   an intermediate write buffer configured to store the write data.

4. The computing system of claim 3, wherein the host does not directly access the intermediate submission queue buffer and the intermediate write buffer of the first electronic device.

5. The computing system of claim 3, wherein the first electronic device is further configured to:
   transmit the write command stored in the intermediate submission queue buffer to the second electronic device in response to a request of the second electronic device receiving the doorbell; and
   transmit the write data stored in the intermediate write buffer to the second electronic device in response to a request of the second electronic device receiving the write command.

6. The computing system of claim 5, wherein the first electronic device is further configured to:
   receive completion information of the write command from the second electronic device receiving the write command and transmit the completion information to the host.

7. The computing system of claim 3, wherein the first electronic device further comprises:
   a doorbell parser configured to request the write command written in the submission queue of the host during at least a portion of parsing the doorbell and transmitting the doorbell to the second electronic device, wherein the doorbell parser is implemented by a hardware processor in the first electronic device.

8. The computing system of claim 7, wherein the doorbell parser is further configured to access the submission queue of the host indicated by an address of the doorbell.

9. The computing system of claim 3, wherein the first electronic device further comprises:
   a command parser configured to request the write data stored in the data buffer of the host during at least a portion of parsing the write command and transmitting the write command to the second electronic device, wherein the command parser is implemented by a hardware processor in the first electronic device.

* * * * *